United States Patent
Nishiuchi et al.

(10) Patent No.: US 6,894,962 B1
(45) Date of Patent: May 17, 2005

(54) OPTICAL INFORMATION RECORDING MEDIUM WITH SECTOR ADDRESS INFORMATION

(75) Inventors: Kenichi Nishiuchi, Osaka (JP); Ken'ichi Nagata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,865

(22) PCT Filed: Oct. 19, 1999

(86) PCT No.: PCT/JP99/05771
§ 371 (c)(1),
(2), (4) Date: Apr. 19, 2001

(87) PCT Pub. No.: WO00/23990
PCT Pub. Date: Apr. 27, 2000

(30) Foreign Application Priority Data

Oct. 21, 1998 (JP) .......................... 10-299393

(51) Int. Cl.⁷ ................................................ G11B 5/09
(52) U.S. Cl. ................. 369/47.51; 369/53.2; 369/275.3
(58) Field of Search .......................... 369/30.04, 30.1, 369/30.11, 30.12, 47.5, 47.51, 47.52, 47.54, 53.2, 53.22, 53.41, 94, 275.3

(56) References Cited

U.S. PATENT DOCUMENTS

| | | | |
|---|---|---|---|
| 5,303,225 A | * | 4/1994 | Satoh et al. ............. 369/275.3 |
| 5,452,284 A | | 9/1995 | Miyagawa et al. |
| 5,616,390 A | | 4/1997 | Miyagawa et al. |
| 5,726,969 A | | 3/1998 | Moriya et al. |
| 5,818,812 A | | 10/1998 | Moribe et al. |
| 5,852,599 A | | 12/1998 | Fuji |
| 5,883,958 A | | 3/1999 | Ishiguro et al. |
| 5,936,933 A | | 8/1999 | Miyamoto et al. |
| 6,002,655 A | | 12/1999 | Ono et al. |
| 6,052,465 A | | 4/2000 | Gotoh et al. |
| 6,091,678 A | * | 7/2000 | Fushimi et al. .......... 369/44.26 |
| 6,266,299 B1 | | 7/2001 | Oshima et al. |
| 6,370,091 B1 | | 4/2002 | Kuroda |
| 6,370,102 B1 | * | 4/2002 | Mons et al. .................. 369/94 |

FOREIGN PATENT DOCUMENTS

| | | |
|---|---|---|
| EP | 0 549 488 | 6/1993 |
| EP | 0 715 301 A2 | 6/1996 |

(Continued)

OTHER PUBLICATIONS

Chinichi Tanaka, et al.,; "Additional Information Recording Method on DVD–ROM Disk: BCA (Burst Cutting Area)".; Technical Research Report of the Institute of Electronics, Information and Communication Engineers, MR97–33; Oct. 1997; pp. 33–38. (Partial English translation).
International Search Report for PCT/JP99/05771.

*Primary Examiner*—Paul W. Huber
(74) *Attorney, Agent, or Firm*—Merchant & Gould P.C.

(57) ABSTRACT

An optical information recording medium includes a substrate 1 and two information layers (2, 4) formed on the substrate. The information layer is formed of a thin film showing a change that can be detected optically by irradiation of a light beam 7. A separating layer 3 that is transparent to a wavelength of the light beam 7 is formed between the information layers 2 and 4. Each information layer (2, 4) includes a sector area having sector address portions (9, 13) and data areas (8, 12) for recording information signals, the sector address portion and the data area being divided in the circumferential direction, and a management area (10, 14) for recording identification information about the amount of dislocation between the sector address portions 9 and 14 in the circumferential direction. Thus, the identification information about the amount of dislocation can be recorded, so that demodulation errors during reproduction can be reduced by switching amplification gain or slice level during reproduction according to the identification information. Also, stable data recording can be achieved by switching recording power according to a gate signal.

25 Claims, 12 Drawing Sheets

FOREIGN PATENT DOCUMENTS

| | | |
|---|---|---|
| EP | 0 756 279 A2 | 1/1997 |
| EP | 0 802 527 | 10/1997 |
| EP | 1 152 402 A1 | 11/2001 |
| JP | 2-301020 | 12/1990 |
| JP | 3-219440 | 9/1991 |
| JP | 5-314538 | 11/1993 |
| JP | 6-176404 | 6/1994 |
| JP | 6-309673 | 11/1994 |
| JP | 6-338066 | 12/1994 |
| JP | 9-073666 | 3/1997 |
| JP | 9-91781 | 4/1997 |
| JP | 9-97216 | 4/1997 |
| JP | 9-120584 | 5/1997 |
| JP | 9-259438 | 10/1997 |
| JP | 9-265633 | 10/1997 |
| JP | 9-306144 | 11/1997 |
| JP | 10-65662 | 3/1998 |
| JP | 10-83567 | 3/1998 |
| JP | 10-188280 | 7/1998 |
| JP | 11-162031 | 9/1998 |
| JP | 10-233019 | 6/1999 |
| WO | 98/58368 | 12/1998 |
| WO | WO 01/6502 A1 | 1/2001 |

* cited by examiner (a)

(b)

(c)

(d)

OPTICAL INFORMATION RECORDING MEDIUM WITH SECTOR ADDRESS INFORMATION

This application is a 371 of PCT/JP99/05771 filed Oct. 19, 1999.

TECHNICAL FIELD

The present invention relates to a recording medium having a multilayer structure in which optically recordable and reproducible information layers are laminated, and to a recording/reproducing method and apparatus for the same.

BACKGROUND ART

Conventionally, optical disks or optical cards are known as optical information recording media, on which information can be recorded or reproduced optically. These recording media use a semiconductor laser as a light source, and a great deal of information can be recorded or reproduced by irradiation of light that is finely focused through a lens.

At present, there is much research on the above recording media to increase their recording capacities. For example, a recording medium having a multilayer structure whose recording capacity is doubled by laminating information layers to record/reproduce information signals has been proposed (U.S. Pat. No. 5,726,969). Also, a DVD (digital versatile disc)-ROM disk with two information layers has been put into practical use as a read-only optical disk. Moreover, a multilayer recording medium that can be recorded in the user's environment also has been proposed. Such a recording medium is formed of a phase changeable material, a magnet-optical recording material, a dye material, or the like.

On the other hand, an optical recording medium now in use, which includes a single recording layer, employs two types of format for recording signals: a sector-structure system and a continuous recording system. The former is used mainly to record data information, while the latter is used to record sound information, such as CD-R. In an optical disk having a sector structure, an area for managing information to be recorded and a data area on which information signals are recorded by users are separated.

However, when the recording system using a sector structure is applied to a multilayer recording medium, signals reproduced are distorted because of the recorded state of adjacent layers.

FIGS. 12(a) and 12(c) show a cross section of a recordable two-layer recording medium taken along the track direction, respectively. FIGS. 12(b) and 12(d) show the reproduced signals from the information layer of the recording medium. The two-layer recording medium in FIG. 12(a) includes a first information layer 202, a separating layer 203, a second information layer 204, and a protective plate 205 in this order on a substrate 201.

The first information layer 202 has a sector structure including data portions 208 for recording information signals and sector address portions 209 spaced at predetermined lengths of each data portion 208. The sector address portion 209 is used for information management during recording/reproducing information signals. Similarly, the second information layer 204 includes data portions 212 and sector address portions 213.

In FIG. 12(a), the first information layer 202 is not recorded, while a signal is recorded on the second information layer 204. FIG. 12(b) shows a reproduced signal from the second information layer 204. In this case, since the transmissivity of the first information layer 202 is unchanged, the reproduced signal becomes constant according to a pattern that is recorded on the second information layer 204.

On the other hand, in FIG. 12(c), the first information layer 202 is recorded; FIG. 12(d) shows the reproduced signal in this case. Here, the first information layer 202 has such characteristics that the transmissivity is increased by recording information. As shown in FIG. 12(d), the reproduced signal from the second information layer 202 has a waveform whose amplitude is increased in the area corresponding to the recorded portion of the first information layer 202. This is because the transmissivity of the first information layer 202 is raised by recording a signal. When a signal is reproduced from the second information layer 204, light passes through the second information layer 204 twice, i.e., at the time of being focused and reflected. Therefore, the amplitude fluctuation increases in proportion to the square of a change in transmissivity.

As described above, in an optical recording medium having a sector structure, information signals are recorded on the data portions alone and not on the sector address portions. Thus, in reproducing the information signals, the reproduced signal amplitude and the signal level fluctuate significantly depending on the recorded state of the opposite layer. In particular, when the reproduced signal from the second information layer is demodulated, reproduction errors are caused in the area corresponding to the boundary between the sector address portion and the data portion of the first information layer 202, so that the recorded information cannot be demodulated correctly.

Similarly, since the amount of light that reaches the second information layer 204 varies depending on the recorded state of the first information layer 202, information cannot be recorded correctly during recording.

DISCLOSURE OF INVENTION

The present invention is intended to solve the conventional problems described above and has an object of providing an optical information recording medium that can prevent the effect of the recorded state of other information layers, and a recording/reproducing method and apparatus for the same.

To achieve the above object, a first optical information recording medium of the present invention includes a substrate and at least two information layers formed on the substrate. The information layer is formed of a thin film showing a change that can be detected optically by light beam irradiation. A separating layer that is transparent to a wavelength of the light beam is formed between the information layers. Each information layer includes a sector area having sector address portions and data areas for recording information signals, the sector address portion and the data area being divided in the circumferential direction. At least one of the information layers is provided with a management area for recording identification information about the amount of dislocation between the sector address portions of the respective information layers in the circumferential direction. The above optical information recording medium allows the identification information about the amount of dislocation to be recorded. Also, it can reduce demodulation errors during reproduction by switching amplification gain or slice level during reproduction according to the identification information about the amount of dislocation. Similarly, it can provide stable data recording by switching recording power according to a gate signal.

In the first optical information recording medium, it is preferable that the management area is provided with the same form of guide groove as the data area and located close to the data area.

Furthermore, it is preferable that each information layer is provided with a sector position identifier for identifying the positions of the sector address portions of the respective information layers. The sector position identifier has a certain relationship to the sector area in the circumferential direction. In the above optical information recording medium, the amount of dislocation between the sector areas can be determined by specifying the position of the sector position identifier of each information layer in the circumferential direction.

Next, a second optical information recording medium of the present invention includes a substrate and at least two information layers formed on the substrate. The information layer is formed of a thin film showing a change that can be detected optically by light beam irradiation. A separating layer that is transparent to a wavelength of the light beam is formed between the information layers. Each information layer includes a sector area having sector address portions and data areas for recording information signals, the sector address portion and the data area being divided in the circumferential direction. Identification information about the amount of dislocation between the sector address portions of the respective information layers in the circumferential direction is recorded on at least one of the information layers by utilizing the difference in state that can be detected optically in a predetermined pattern different from information signals of the data portion. The above optical information recording medium can reduce demodulation errors during reproduction by switching amplification gain or slice level during reproduction according to the identification information about the amount of dislocation. Similarly, it can provide stable data recording by switching recording power according to a gate signal. Moreover, the use of state difference for recording the identification information can prevent the information from being lost because of recording errors or the like during recording/reproducing of data information.

Next, a third optical information recording medium of the present information includes a substrate and at least two information layers formed on the substrate. The information layer is formed of a thin film showing a change that can be detected optically by light beam irradiation. A separating layer that is transparent to a wavelength of the light beam is formed between the information layers. Each information layer includes a sector area, a management area, and a sector position identifier. The sector area has sector address portions and data areas for recording information signals, the sector address portion and the data area being divided in the circumferential direction. The management area contains the type of information layer or recording conditions. The sector position identifier identifies the sector position and has a certain relationship to the sector area of the information layer in the circumferential direction. In the above optical information recording medium, the amount of dislocation between the sector areas can be determined by specifying the position of the sector position identifier of each information layer in the circumferential direction.

The third optical information recording medium includes a substrate and at least two information layers formed on the substrate. The information layer is formed of a thin film showing a change that can be detected optically by light beam irradiation. A separating layer that is transparent to a wavelength of the light beam is formed between the information layers. Among the information layers, at least the information layer on the light incident side is provided with a management area for recording identification information showing that information is recorded on the entire area of the information layer. The above optical information recording medium can record the identification information, showing that information is recorded on the entire area of the information layer on the light incident side. Thus, a stable operation for confirming the recording on the entire area of the information layer can be performed by recording the identification information. Moreover, since information is recorded on the entire area of the information layer on the light incident side, the difference in the amount of transmitted light between the sector address portion and the data portion of the information layer on the light incident side becomes a predetermined value. Thus, operations for correcting reproduced signal amplitude or recording power can be performed stably.

Furthermore, it is preferable that the recording on an entire area includes recording dummy data having a predetermined pattern on a preliminary signal area located close to the data area after completion of recording information signals on the entire data area of the information layer.

Next, a first recording method for an optical information recording medium of the present invention is a method for recording information signals on the optical information recording medium. The optical information recording medium includes a substrate and at least two information layers formed on the substrate. The information layer is formed of a thin film showing a change that can be detected optically by light beam irradiation. Among the information layers, information signals are recorded on the target information layer after confirming that information signals have been recorded on the entire area of the information layer on the light incident side. In the above recording method, at the time of recording information signals on another information layer, information has been recorded on the entire area of the information layer on the light incident side. Therefore, the difference in the amount of transmitted light between the sector address portion and the data portion of the information layer on the light incident side becomes a predetermined value. Thus, operations for correcting reproduced signal amplitude or recording power can be performed stably.

In the first recording method, it is preferable that the recording on an entire area includes recording dummy data having a predetermined pattern on a preliminary signal area located close to the data area after completion of recording information signals on the entire data area of the information layer.

Furthermore, it is preferable that the recording on an entire area is confirmed by identification information showing that the recording on an entire area is performed, which is provided in any one of the information layers.

Next, a second recording method for an optical information recording medium of the present invention is a method for recording information signals on the optical information recording medium. The optical information recording medium includes a substrate, at least two information layers formed on the substrate, and a separating layer formed between the information layers. The information layer is formed of a thin film showing a change that can be detected optically by light beam irradiation. The separating layer is transparent to a wavelength of the light beam. Each information layer includes a sector area having sector address portions and data areas for recording information signals, the sector address portion and the data area being divided in the circumferential direction. Each information layer further includes a sector position identifier having a certain relationship to the sector area in the circumferential direction. The dislocation between the sector position identifiers of the respective information layers is detected, so that identification information about the amount of dislocation between the sector address portions of the respective information layers in the circumferential direction is obtained and the identification information is recorded on at least one of the information layers. The above recording method can determine the identification information about the amount of dislocation easily as well as reliably.

In the second recording method, it is preferable that the identification information is recorded as sub-information that is different from data information.

Next, a third recording method for an optical information recording medium of the present invention is a method for recording information signals on the optical information recording medium. The optical information recording medium includes a substrate, at least two information layers formed on the substrate, and a separating layer formed between the information layers. The information layer is formed of a thin film showing a change that can be detected optically by light beam irradiation. The separating layer is transparent to a wavelength of the light beam. Each information layer includes a sector area having sector address portions and data areas for recording information signals, the sector address portion and the data area being divided in the circumferential direction. Among the information layers, a signal is recorded on the continuous tracks in the sector area of the information layer on the light incident side with at least one sector being left unrecorded. Then, a signal is reproduced from the information layer that is further from the information layer on the light incident side. The time difference between a pulse-fall point of the sector address portion of the distant information layer, corresponding to the unrecorded portion of the information layer on the light incident side, and a pulse-rise point of the recorded portion of the information layer on the light incident side is calculated, so that identification information about the amount of dislocation between the sector address portions of the respective information layers in the circumferential direction is obtained and the identification information is recorded on at least one of the information layers. The above recording method can determine the amount of dislocation between the sector areas in the circumferential direction without relying on the sector position identifier.

In the third recording method, it is preferable that the identification information is recorded as sub-information that is different from data information.

Next, a fourth recording method for an optical information recording medium of the present invention is a method for recording information signals on the optical information recording medium. The optical information recording medium includes a substrate, at least two information layers formed on the substrate, and a separating layer formed between the information layers. The information layer is formed of a thin film showing a change that can be detected optically by light beam irradiation. The separating layer is transparent to a wavelength of the light beam. Each information layer includes a sector area having sector address portions and data areas for recording information signals, the sector address portion and the data area being divided in the circumferential direction. The guide groove in the data area is formed of a wobbled groove wobbling in a predetermined cycle. The amount of wobble is measured, so that identification information about the amount of dislocation between the sector address portions of the respective information layers in the circumferential direction is obtained and the identification information is recorded on at least one of the information layers. The above recording method allows the amount of dislocation to be measured directly in length, and thus the amount of dislocation can be determined precisely.

In the fourth recording method, it is preferable that the identification information is recorded as sub-information that is different from data information.

Next, a first recording/reproducing apparatus for an optical information recording medium of the present invention performs recording/reproduction of information signals on the optical information recording medium. The optical information recording medium includes a substrate, at least two information layers formed on the substrate, and a separating layer formed between the information layers. The information layer is formed of a thin film showing a change that can be detected optically by light beam irradiation. The separating layer is transparent to a wavelength of the light beam. Each information layer includes a sector area having sector address portions and data areas for recording information signals, the sector address portion and the data area being divided in the circumferential direction. The recording/reproducing apparatus includes a sector dislocation identifying means, a gate generating means, and a reproduced signal correcting means. The sector dislocation identifying means detects the amount of dislocation between the sector areas of the respective information layers in the circumferential direction. The gate generating means controls timing for correcting the fluctuation in a reproduced signal, caused by the effect of the recorded state of each information layer, based on the detected dislocation amount. The reproduced signal correcting means corrects a reproduced signal in accordance with a gate signal from the gate generating means. The above recording/reproducing apparatus can reduce demodulation errors during reproduction by switching amplification gain or slice level during reproduction according to a gate signal.

In the first recording/reproducing apparatus, it is preferable that the reproduced signal correcting means switches the amplification gain of a reproduced signal in accordance with the gate signal.

Furthermore, it is preferable that the reproduced signal correcting means switches the slice level of a reproduced signal in accordance with the gate signal.

It is preferable that at least one of the information layers is provided with a management area for recording identification information about the amount of dislocation, and that the sector dislocation identifying means demodulates the identification information on the management area to detect the amount of dislocation.

It is preferable that the identification information is recorded on the management area as sub-information that is different from data information.

It is preferable that each information layer is provided with a sector position identifier for identifying positions of the sector address portions of the respective information layers, the sector position identifier having a certain relationship to the sector area in the circumferential direction, and that the amount of dislocation is determined by dislocation between the sector position identifiers of the respective information layers.

It is preferable that the amount of dislocation is determined in the following manner: among the information layers, a signal is recorded on continuous tracks in the sector area of the information layer on the light incident side with at least one sector being left unrecorded; a signal is reproduced from the information layer that is further from the information layer on the light incident side, and a time difference between a pulse-fall point of the sector address portion of the distant information layer, corresponding to the unrecorded portion of the information layer on the light incident side, and a pulse-rise point of the recorded portion of the information layer on the light incident side is calculated. The above recording/reproducing apparatus can determine the amount of dislocation between the sector areas in the circumferential direction without relying on the sector position identifier.

It is preferable that the guide groove in the data area is formed of a wobbled groove wobbling in a predetermined cycle, and that the amount of dislocation is determined by measuring the amount of wobble. The above recording/reproducing apparatus allows the amount of dislocation to be measured directly in length, and thus the amount of dislocation can be determined precisely.

Next, a second recording/reproducing apparatus for an optical information recording medium of the present invention performs recording/reproduction of information signals on the optical information recording medium. The optical information recording medium includes a substrate, at least two information layers formed on the substrate, and a separating layer formed between the information layers. The information layer is formed of a thin film showing a change that can be detected optically by light beam irradiation. The separating layer is transparent to a wavelength of the light beam. Each information layer includes a sector area having sector address portions and data areas for recording information signals, the sector address portion and the data area being divided in the circumferential direction. The recording/reproducing apparatus includes a sector dislocation identifying means, a gate generating means, and a power switching means. The sector dislocation identifying means detects the amount of dislocation between the sector areas of the respective information layers in the circumferential direction. The gate generating means controls timing for correcting the fluctuation in recording power, caused by the effect of the recorded state of each information layer, based on the detected dislocation amount. The power switching means switches recording power in accordance with a gate signal from the gate generating means. The above recording/reproducing apparatus can provide stable data recording by switching recording power according to a gate signal.

In the second recording/reproducing apparatus, it is preferable that at least one of the information layers is provided with a management area for recording identification information about the amount of dislocation, and that the sector dislocation identifying means demodulates the identification information to detect the amount of dislocation.

It is preferable that the identification information is recorded on the management area as sub-information that is different from data information.

It is preferable that each information layer is provided with a sector position identifier for identifying positions of the sector address portions of the respective information layers, the sector position identifier having a certain relationship to the sector area in the circumferential direction, and that the amount of dislocation is determined by dislocation between the sector position identifiers of the respective information layers.

It is preferable that the amount of dislocation is determined in the following manner: among the information layers, a signal is recorded on continuous tracks in the sector area of the information layer on the light incident side with at least one sector being left unrecorded; a signal is reproduced from the information layer that is further from the information layer on the light incident side, and a time difference between a pulse-fall point of the sector address portion of the distant information layer, corresponding to the unrecorded portion of the information layer on the light incident side, and a pulse-rise point of the recorded portion of the information layer on the light incident side is calculated. The above recording/reproducing apparatus can determine the amount of dislocation between the sector areas in the circumferential direction without relying on the sector position identifier.

It is preferable that the guide groove in the data area is formed of a wobbled groove wobbling in a predetermined cycle, and that the amount of dislocation is determined by measuring the amount of wobble. The above recording/reproducing apparatus allows the amount of dislocation to be measured directly in length, and thus the amount of dislocation can be determined precisely.

BEST MODE FOR CARRYING OUT THE INVENTION

Hereinafter, an embodiment of the present invention will be described with reference to the accompanying drawings.

Embodiment 1

Figure 1:
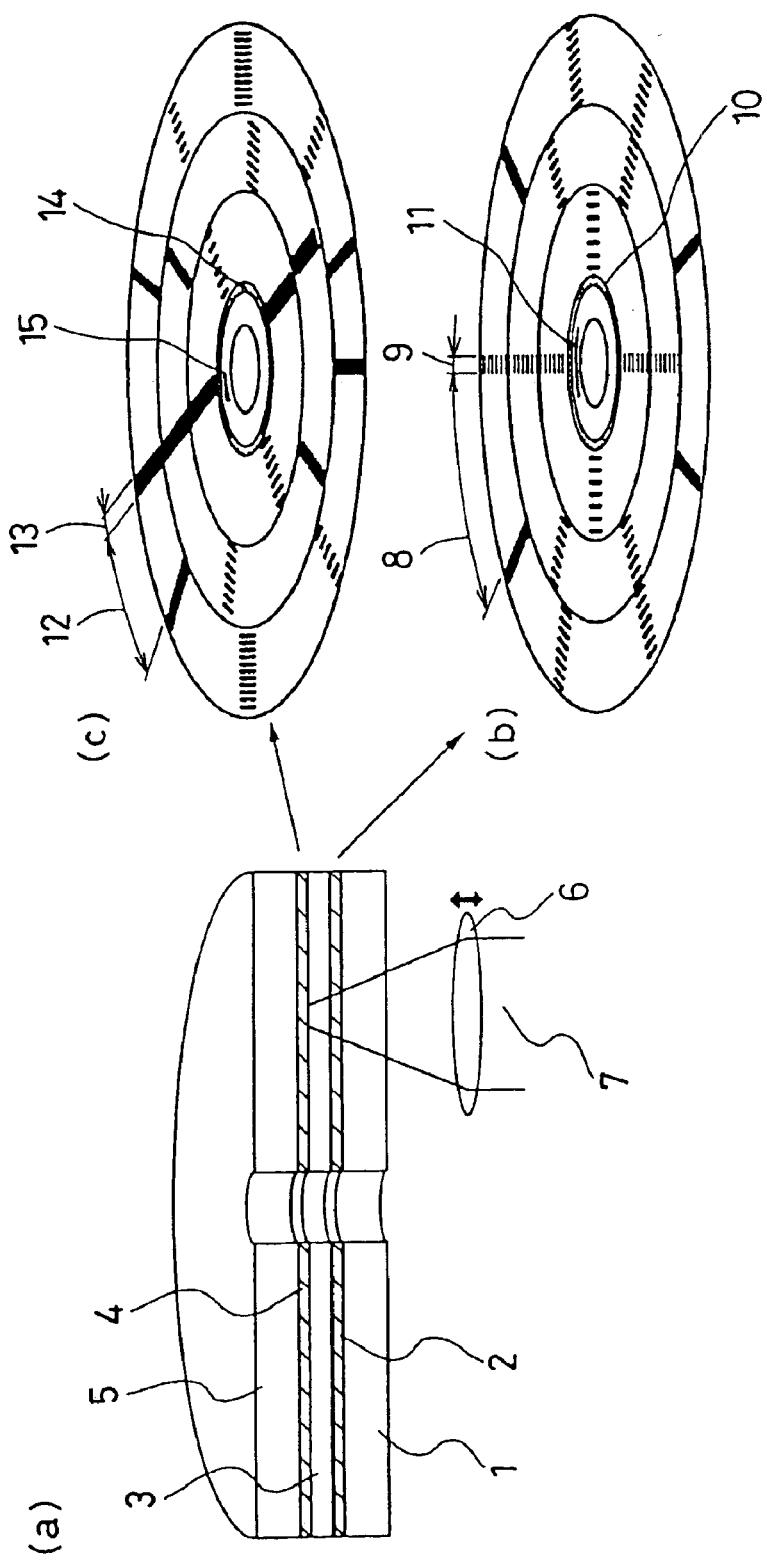
FIG. 1 is a configuration diagram of an optical information recording medium according to an embodiment of the present invention.

FIG. 1 shows a configuration of an optical information recording medium according to Embodiment 1 of the present invention. FIG. 1(a) is a cross-sectional view of the optical information recording medium that includes a first information layer 2, a separating layer 3, a second information layer 4, and a protective plate 5 in this order on a substrate 1. Information signals are recorded/reproduced on the first information layer 2 with a light beam 7 focused by an objective lens 6 from the side of the substrate 1, and the light beam through the first information layer 2 is used for recording/reproduction on the second information layer 4.

FIG. 1(b) shows a configuration of a recording area of the first information layer 2. The recording area has a sector structure including data portions 8 for recording information signals and sector address portions 9 for managing the location of data to be recorded. The recording medium of this embodiment employs the sector format referred to as ZCLV (i.e., zoned constant linear velocity) or MCAV (i.e., modified constant angular velocity). With this format, the number of sectors per revolution is increased gradually from the inner to the outer circumference of the recording medium. Thus, the length of the data portions divided by the sector address portions is fixed substantially in each information layer.

The data portion 8 is formed of a spiral guide groove for tracking or sample pits. The sector address portion 9 is formed of address pit trains arranged in a pattern corresponding to address information. Moreover, a management area 10 is provided in the inner circumference of the recording medium, where information about the type of recording medium, recording conditions, or the like is recorded beforehand. The management area may include an area for recording information about the dislocation between the sectors of the respective information layers, if necessary. Furthermore, a disk position identifier 11 for identifying the sector position in each information layer is provided in the inner circumference of the recording medium, if necessary.

FIG. 1(c) shows a configuration of the second information layer 4. Like the first information layer 2, the second information layer 4 has a data area including data portions 12 and sector address portions 13, a management area 14, and a disk position identifier 15 on the surface thereof. The amount of dislocation between the two information layers 2 and 4 can be determined by specifying the dislocation between the disk position identifiers 11 and 15 in the circumferential direction.

The obtained dislocation amount is recorded on at least one of the management areas 10, 14 of the two information layers. Though the details will be described later, the amount of dislocation is used for specifying the positions of the sector address portions of adjacent information layers, for switching reproduction conditions in reproducing information signals, and for switching recording power in recording information signals. Consequently, favorable recording/reproduction on a multilayer recording medium can be achieved.

As can be seen from FIGS. 1(b) and 1(c), the first information layer 2 is the same as the second information layer 4 in the arrangement or the number of sectors. Moreover, it is preferable that both have the same number of tracks. This is because system operations, such as managing the data recording area of each information layer, become simple.

In this embodiment, the management area in the recording medium is provided in the inner circumference of the data recording area. However, it may be provided in the outer circumference thereof. When both sides of the data recording area include the management area, the reliability of the recording medium can be improved against the loss of data caused by scratches or the like.

As shown in FIGS. 1(b) and 1(c), the disk position identifiers 11, 15 are formed in the area other than the data portions 8, 12, sector address portions 9, 13, and the management areas 10, 14 of the information layers. Specifically, the disk position identifier 11 is located in the inner circumference of the management area 10 so that a certain relationship in the position of the disk position identifier 11 and the sector address portion 9 is established in the circumferential direction, as shown in FIG. 1(b). Also, the disk position identifier 15 is located in the inner circumference of the management area 14 so that a certain relationship in the position of the disk position identifier 15 and the sector address portion 13 is established in the circumferential direction, as shown in FIG. 1(c).

To distinguish which identifier belongs to each information layer, the disk position identifiers 11 and 15 differ in shape or radial positions. Moreover, the pattern that forms pit trains in the sector address portion and the management area or a guide groove in the data portion under certain conditions can be used as the pattern of the disk position identifier.

Figure 2:
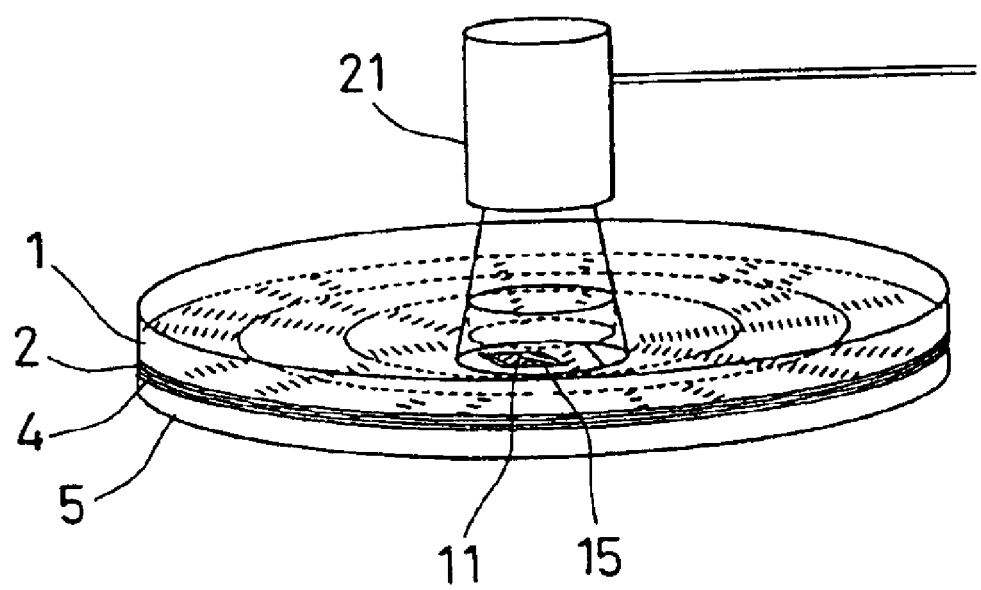
FIG. 2 is a configuration diagram showing an embodiment of a method for measuring the amount of sector dislocation in an optical information recording medium of the present invention.

Next, a method for determining the amount of sector dislocation between the information layers using the disk position identifiers will be described with reference to FIG. 2. FIG. 2 is a schematic view showing a method for measuring the amount of sector dislocation between the information layers in the recording medium shown in FIG. 1. The method is such that the disk position identifiers 11, 15 of the two information layers 2, 4 are detected with a photodetector 21, then the positional relationship between the identifiers is specified, and thus the amount of dislocation in the disk is specified.

As the photodetector 21, TV cameras or image sensors can be used. The lens used in these devices, unlike the objective lens shown in FIG. 1, has a sufficiently large focus depth. Therefore, the two information layers can be observed at the same time. As shown in FIG. 2, since the two identifiers 11, 15 are in the field of observation, the distance between them can be determined easily by image processing. When the distance is large, the multilayer recording medium is rotated so as to specify each of the identifiers. Thus, the amount of dislocation between two information layers can be determined by the position of each identifier in the observation field relative to the angle of rotation.

Information about the sector dislocation between the information layers thus determined is recorded on at least one of the management areas 10, 14 in the same manner as data recording. The items of data common to recording media have been provided on the substrate surface as ROM information in the form of concave-convex pits.

On the other hand, the management information for individual recording media is recorded after a multilayer recording medium is produced. Therefore, a recordable area, which is formed of a guide groove or the like similarly to the data portion, is necessary. In DVD-RAM or the like, such an area corresponds to the area called lead-in or lead-out, where defects in the recording medium are registered.

The recordable management area in a recording medium of the present invention includes a dislocation information recording area containing information about the sector dislocation between the information layers. Thus, the sector dislocation information obtained in the above manner can be recorded on this area by the irradiation of modulated light, like data information.

The management information may be recorded on both information layers. When the management information is reproduced at the time of inserting the recording medium in an apparatus and stored on the memory thereof, it is not necessary to read the management information for each recording/reproduction. Therefore, the management information may be recorded on one of the information layers. In this case, it is preferable that the information layer closest to the light incident side contains the management information, considering that the effect of other information layers is small.

There are other methods for recording the sector dislocation information: a burst cutting area (BCA) is provided in the area other than the data recording area in a recording medium; the BCA contains sub-information in the form of modulated code, such as a bar code, that is different from data information. For recording, a strong laser beam is focused on the information layer while rotating the recording medium circumferentially. The shape of the laser beam is long in the radial direction of the recording medium, i.e., the laser beam has a width larger than at least the amount of eccentricity of a guide groove (e.g., about 2 mm). At this time, pulsed light, which is modulated by the signal that is coded according to the management information of the recording medium, is radiated to form a pattern of stripes on the circumference.

Information to be recorded on the BCA is for the individual recording media, such as sector dislocation information, or for managing each recording medium. Thus, the data capacity is sufficiently small. Therefore, the BCA can be located in any area except the data recording area and the recordable management area. Also, at least part of the BCA may be overlapped with the read-only management area.

When information is recorded on the BCA, the information layer is damaged. Therefore, the BCA differs from the area irradiated with light in reflectance. This allows a recording/reproducing apparatus for reproducing the data area to perform a focusing operation. In such a case, for the purpose of separation from the read-only pit information on the management area, a low-pass filter (LPF) or the like is used to separate signals to be demodulated, and thus the sector dislocation information can be obtained.

When a recording medium includes information layers that cause a change in condition, partially deformation, or diffusion, the striped area showing changes is formed according to each recording mode of the information layers, so that signals can be obtained. For example, with the information layers utilizing a phase change between amorphous and crystalline states, the striped area is left at the time of initialization, in which the information layers that have been formed in the amorphous state are changed to be in the crystalline state, and thus the BCA pattern can be provided. This allows the sector dislocation information to be recorded without damaging the information layer, as described above.

Furthermore, this method can prevent the sector dislocation information from being lost because of recording errors or the like during recording/reproducing data information, compared with the case where the sector dislocation information is recorded on the recordable management area in a pattern similar to data information, as is described above.

Figure 3:
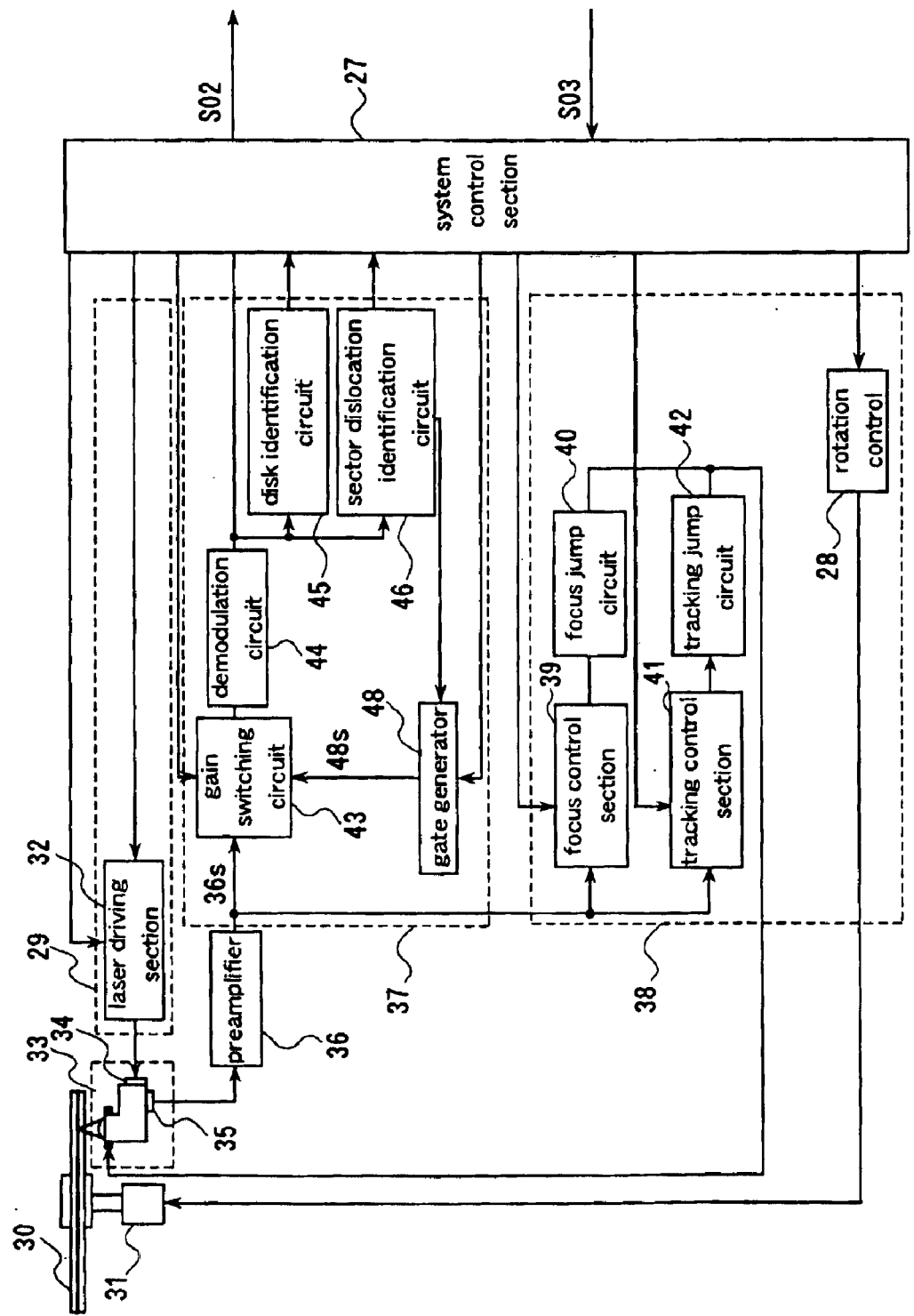
FIG. 3 is a block diagram of a reproduction apparatus for an optical information recording medium according to an embodiment of the present invention.

Hereinafter, a method for recording/reproducing information signals on the recording medium in FIG. 1 and an apparatus employing this method will be described with reference to a block diagram in FIG. 3.

When a recording medium 30, which is a multilayer recording medium, is inserted in a recording/reproducing apparatus, a control signal S03 is input to a system control section 27 from an external device, such as personal computers or the like. The system control section 27 controls the entire apparatus. First, a motor 31 is driven by a rotation control circuit 28 so as to rotate the recording medium 30 at a predetermined speed.

A laser driving section 32 in a light modulation system 29 for controlling a light source drives a semiconductor laser 34 in an optical pickup 33 by supplying electric current so that the semiconductor laser 34 emits a laser beam to generate reproduction power. Then, the recording medium 30 is irradiated with the light beam by an optical system in the optical pickup 33. The light reflected from the recording medium is received by a photodetector 35 having a plurality of separate light-receiving surfaces. The signal from each light-receiving surface is amplified with a preamplifier 36, and thus a reproduced signal 36s is obtained. The reproduced signal 36s is sent to a signal reproduction system 37 and a control system 38. The signal reproduction system 37 demodulates information signals; the control system 38 controls focusing, tracking, or the like.

A focus control section 39 in the control system 38 uses a portion of the reproduced signal 36s to focus a light beam on the information layer. Then a focus jump circuit 40 moves the focusing position to the target information layer, which is one of the plural information layers in the recording medium. On the other hand, a tracking control section 41 uses the reproduced signal 36s to perform tracking control by scanning the tracks on the information layer, and the target track can be reproduced by a tracking jump circuit 42.

When information is reproduced from the tracks in the recording medium 30, the management information of the recording medium 30 is reproduced first. Specifically, the control system 38 performs servo operations, and a signal is reproduced from the management area in the recording medium 30. The reproduced signal 36s passes through a gain switching circuit 43 so as to have predetermined amplitude. Then, a demodulation circuit 44 converts the reproduced signal 36s to a plurality of information signals, and a disk identification circuit 45 identifies the type of disk inserted.

When the result is, e.g., that the recording medium includes two or more information layers, a sector dislocation identification circuit 46 demodulates the sector dislocation information that has been recorded on the management area and shows the relative positions of the sectors of the respective information layers. Thus, the amount of dislocation between the plural information layers is specified. Moreover, the result of demodulation is sent to the system control section 27, and the amount of sector dislocation between the target information layer and the information layer on the light source side is sent to a gate generator.

Next, a method for compensating for the fluctuation in amplitude of the information layers by switching the amplification gain of the reproduced signal using sector dislocation information will be described with reference to FIG. 3 and the timing diagram in FIG. 4. FIG. 4(a) shows an example of reproducing a signal from the second information layer 4 through the first information layer 2 when there is the sector dislocation between the two information layers 2 and 4.

Figure 12:
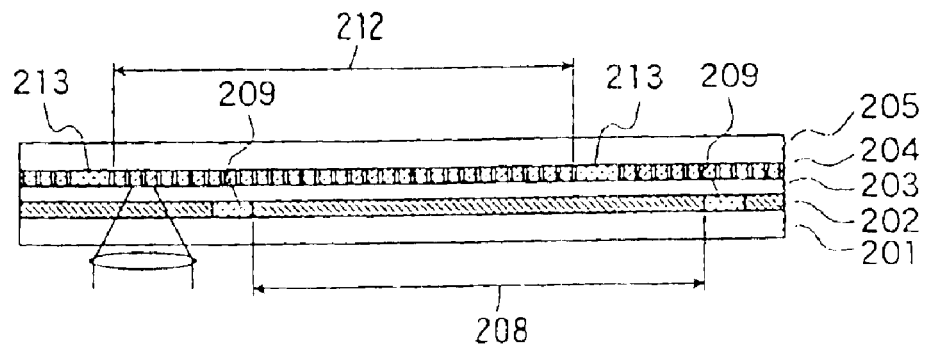
FIG. 12 is a cross-sectional view showing an example of a function of a conventional optical information recording medium.
Figure 12:
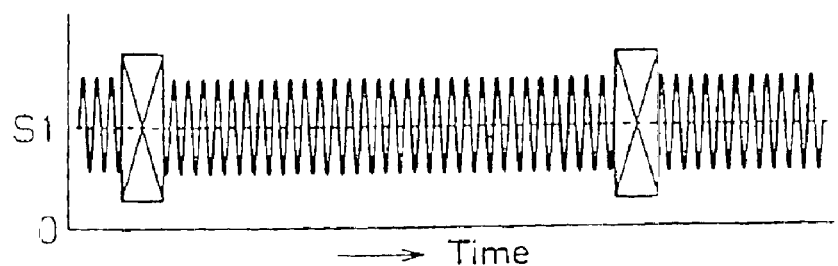
Figure 12:
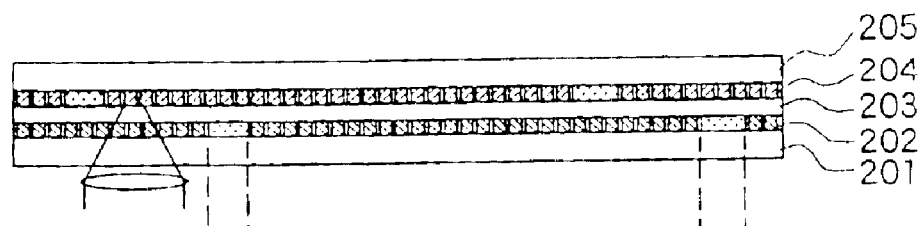
Figure 12:
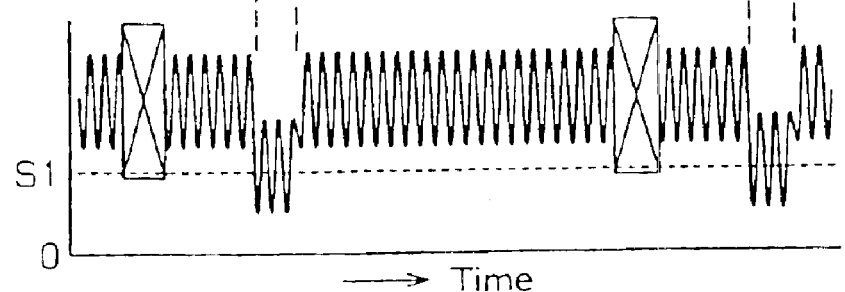

As with FIG. 12(c), a signal is recorded on both information layers 2 and 4. The reproduced signal 36s from the second information layer 4 has a waveform whose amplitude and signal level is increased in the area corresponding to the data portion 8 of the first information layer 2, as shown in FIG. 4(b). A signal reproduced from the area corresponding to the sector address portion 13 of the second information layer 4 varies in amplitude depending on a system for forming address pits. Therefore, the signal is not explained in detail, but indicated by a mark.

For the reproduced signal 36s, the system control section 27 calculates gate-timing data corresponding to the amount of dislocation and outputs the data to a gate generator 48. The gate generator 48 generates a gate signal 48s (see FIG. 4(c)) corresponding to the sector dislocation information. A gain switching circuit 43 switches the amplification gain of the reproduced signal quickly in response to the gate signal 48s and provides a reproduced signal 43s (see FIG. 4(d)).

As a result, the amplitude of the reproduced signal is the same as that in the case where the first information layer 2 is not recorded. Thus, by comparing it with a slice level S1 in the unrecorded portion, the reproduced signal can be demodulated. The gain switching circuit 43 can perform gain correction quickly, and such high-speed gain correction is carried out even in the last area of the gate signal.

As described above, this embodiment can compensate for a change in the signal level between the information layers while suppressing a change in gain caused by information about a recording medium, foreign materials, or the like.

Figure 5:
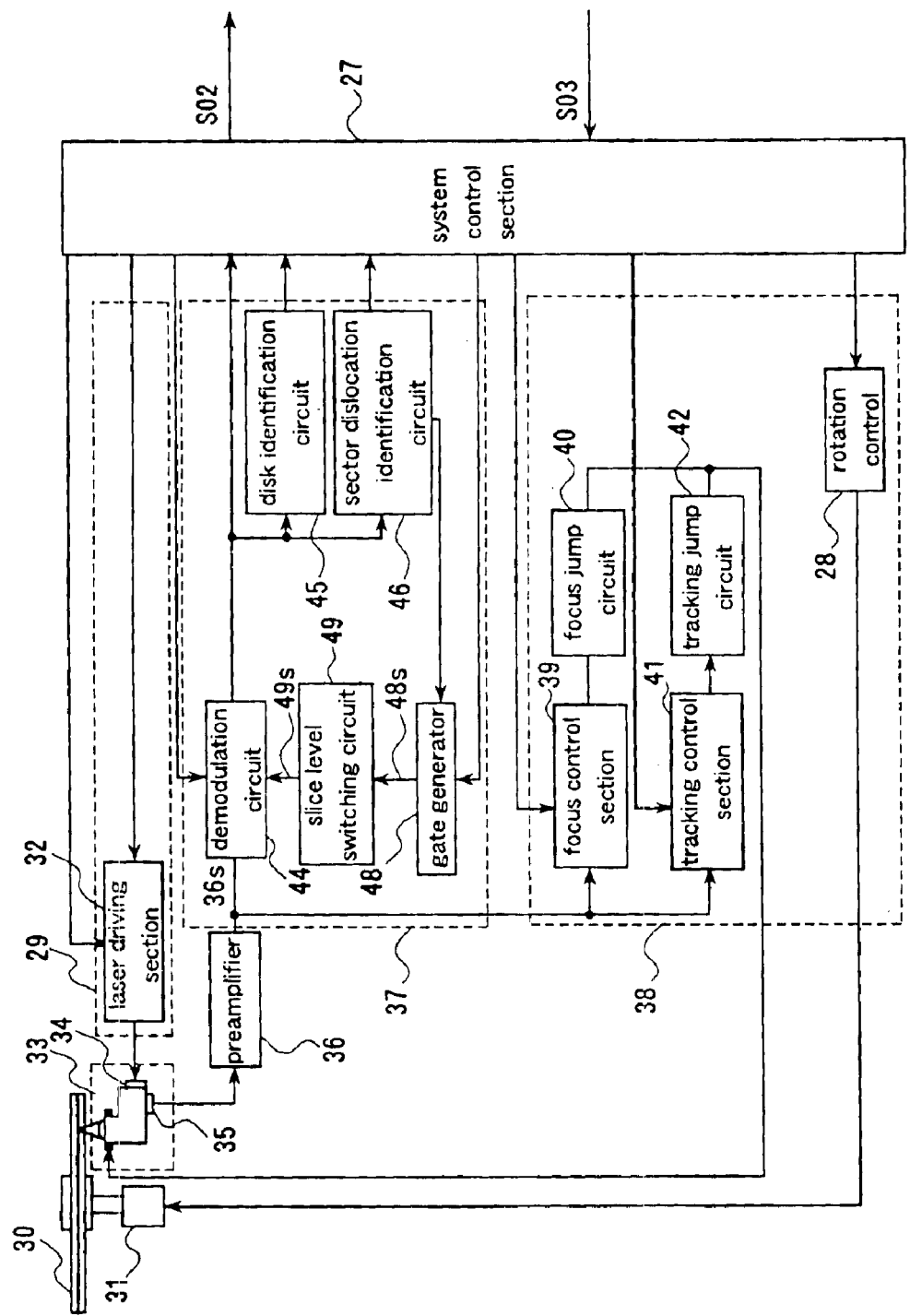
FIG. 5 is a block diagram of a reproduction apparatus for an optical information recording medium according to another embodiment of the present invention.

Next, a second method for compensating for the amplitude fluctuation during reproduction will be described with reference to the block diagram of an apparatus in FIG. 5 and the timing diagram in FIG. 6. This method is such that a slice level for demodulating a reproduced signal is switched according to the dislocation between sectors.

Based on the sector dislocation information identified by the sector dislocation identification circuit 46, the system control section 27 calculates gate-timing data corresponding to the amount of dislocation and outputs the data to the gate generator 48. The gate generator 48 generates a gate signal 48s corresponding to the amount of sector dislocation and sends it to a slice level switching circuit 49 (see FIG. 6(b)).

The slice level switching circuit 49 switches the slice level of the reproduced signal of the demodulation circuit 44 quickly in response to the gate signal 48s, so that the reproduced signal 36s is changed to a two-level signal with two different amplitudes, each having a median represented by S1 and S2 (see FIG. 6(c)).

As a result, it is possible to perform demodulation that compensates for the amplitude fluctuation of the second information layer 4, corresponding to the sector address portion 9 of the first information layer 2. The slice level switching circuit 49 switches the slice level quickly, and S1 and S2 maintain the value in the range of "H" and "L" of the gate signal, respectively. This allows each slice level to follow the fluctuation in the recording medium.

The foregoing described the effect of the information layer on the light incident side upon the adjacent information layer that is further from the light incident side, e.g., the recorded state of the first information layer causes the amplitude fluctuation of the reproduced signal from the second information layer. However, there are some cases where the information layer located further from the light incident side has an effect on the reproduction of the signal from the information layer on the light incident side.

For example, when a signal is reproduced from the first information layer, a portion of light is transmitted through the first information layer, reflected from the second information layer, again passes through the first information layer, and enters a photodetector in an optical pickup. In this case, since the light spot on the second information layer is not in the focal position, only a portion of the reflected light from the second information layer again passes through an objective lens in the optical pickup and reaches the inside photodetector. The reflected light from the second information layer acts as an offset voltage, which increases the whole level of the signal voltage of the reproduced signal from the first information layer, i.e., the light reflected from the first information layer. For example, suppose that the second information layer has such characteristics that the reflected light is reduced by recording. When a signal is reproduced from the first information layer located in the same position as the recording area of the second information layer, a level of the reproduced signal from the area corresponding to the data recorded area is lower in the sector address portion of the second information layer than in the unrecorded portion thereof. Even when such a phenomenon occurs, information can be reproduced stably by correcting the slice level of the reproduced signal using the sector dislocation information.

Figure 7:
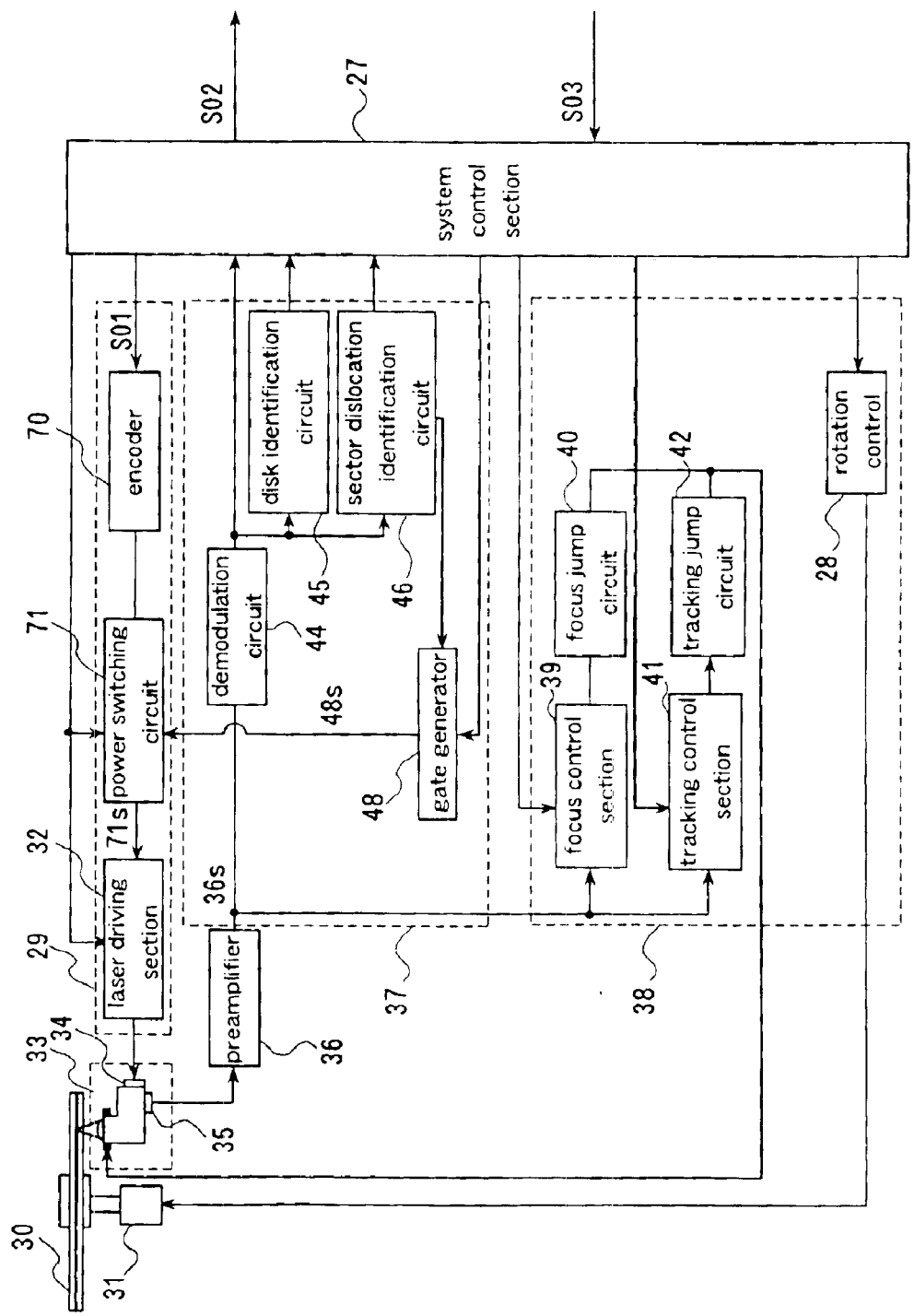
FIG. 7 is a block diagram of a recording apparatus for an optical information recording medium according to an embodiment of the present invention.

Next, a method for recording a signal on the second information layer based on the sector dislocation information with the first information layer being recorded will be described. The operation will be described with reference to the block diagram of an apparatus for recording information signals in FIG. 7 and the timing diagram in FIG. 8.

First, a control signal S03 from an external device is input to the system control section 27 to give recording instructions, and at the same time, a recording signal S01 is input. The recording signal S01 is provided to an encoder 70 in the optical modulation system 29 from a buffer in the system control section 27 with predetermined timing. The encoder 70 converts the recording signal S01 to a recording format, such as EFM signal, NRZi signal, or the like, as well as a sector format defined by the recording medium. The coded signal is sent to a power switching circuit 71.

The power switching circuit 71 converts the coded signal to a laser power level and allows the semiconductor laser 34 in the optical pickup 33 to emit light with a predetermined power through the laser driving circuit 32.

The process until the detection of sector dislocation information is the same as that in the demodulation that compensates for amplitude fluctuation described above. The gate generator 48 generates a gate signal 48s corresponding to the sector address portion 9 of the first information layer (see FIG. 8(b)). The power switching circuit 71 provides a power switching signal 71s, which switches power during recording, to the laser driving section 32 with the timing of the gate signal 48s (see FIG. 8(c)).

FIG. 8(c) shows an example of the power switching signal 71s when recording is performed with the light modulated between two power levels Pp and Pb. For the sector address portion 13 of the second information layer 4, the reproduction power is taken as Pr. When a signal is recorded on the second information layer 4 through the data portion of the first information layer 2, the information layer is irradiated with the light modulated between Pp2 and Pb2. When a signal is recorded on the data portion of the second information layer 4 through the sector address portion 9 of the first information layer 2, the first information layer 2 is irradiated with the light modulated between Pp1 and Pb1.

In this example, the first information layer 2 exhibits its characteristics that the transmissivity is increased by recording a signal on the data portion. The power of Pp1 is higher than that of Pp2; the power of Pb1 is higher than that of Pb2. The value of Pp2 and Pb2 in this case depends on the recording range of information on the first information layer 2. That is, in recording a signal on the second information layer 4, the larger a proportion of the data-recorded tracks in the area irradiated with a light beam on the first information layer 2, the lower the power of Pp2 and Pb2 needs to be.

Thus, the value of Pp2 and Pb2 is determined in such a manner that the recording area of the first information layer 2 equal to the radius of recording of the second information layer 4 is specified by the information on the management area of the first information layer 2, and an increase in the amount of transmitted light relative to the incident light beam is calculated. As a result, the power reaching the data portion of the second information layer 4 becomes constant, allowing for favorable recording on the second information layer 4.

The foregoing described mainly a multilayer recording medium including two information layers. However, the present invention can be applied to a recording medium including many more information layers. For example, when four information layers are provided and a signal is recorded/reproduced on a fourth information layer, which is most distant from a light source, information about the sector position of each information layer is obtained by using disk position identifiers with four types of pattern and determining the positional relationship between them.

Next, the sector position information is recorded on the management area. When the reproduced signal from the fourth information layer is demodulated, the system control section calculates the time base for three types of gate signal, each of which corresponds to the sector address portions of the first, second, and third information layers. Then, reproduction gain is switched to the four levels of gain, including the sector address portions of the three layers, according to the timing provided by the gate generator.

Furthermore, there is a method in which information signals are reproduced by setting four slice levels. Similarly, when a signal is recorded on the fourth information layer, the information layer is irradiated with the light that is corrected by four types of power level corresponding to the sector address portions of the three information layers on the light incident side, so that a signal can be recorded.

The basic process of the above method is such that, first, a recording medium having disk position identifiers is produced, the disk position identifier detecting the amount of dislocation between the sector address portions of the respective information layers in the multilayer recording medium. Then, the amount of dislocation between the sector address portions of the respective information layers is detected based on the positional relationship between the disk position identifiers. The amount of dislocation thus detected is recorded on the management area in the recording medium.

Next, the amount of dislocation is demodulated, and the demodulation conditions of a reproduced signal are switched using a gate signal corresponding to the sector address portion, so that favorable reproduction of signals from the recording medium is possible. Also, favorable recording can be performed by switching recording power using the gate signal corresponding to the sector address portion.

Furthermore, to determine the effect of a plurality of information layers on the adjacent information layers, there is a method as follows: the characteristic data of the information layers, which have been recorded on the management area and shows the basic characteristics of each information layer, are read; information about the recording range of adjacent information layers is added, and a range of switching recording/reproducing conditions is calculated.

In this case, the characteristic data of the information layers to be written in the management area in the recording medium include the transmissivity and reflectance of each information layer when signals are not recorded and those when signals are recorded on the continuous tracks. Since the difference in the characteristic data between recording media is small and within the range of variation during manufacturing, the characteristic data can be provided in the read-only management area.

As described above, in this embodiment, the amount of sector dislocation between the plural information layers is detected, and a gate signal corresponding to that amount is generated. Thus, demodulation errors during reproduction can be reduced by switching amplification gain or slice level during reproduction according to the gate signal. Similarly, stable data recording can be achieved by switching recording power according to the gate signal.

Embodiment 2

In Embodiment 1, the disk position identifiers are provided on each information layer in a recording medium to detect the amount of sector dislocation. On the other hand, a method for detecting the amount of sector dislocation of this embodiment does not require the disk position identifiers.

Figure 9:
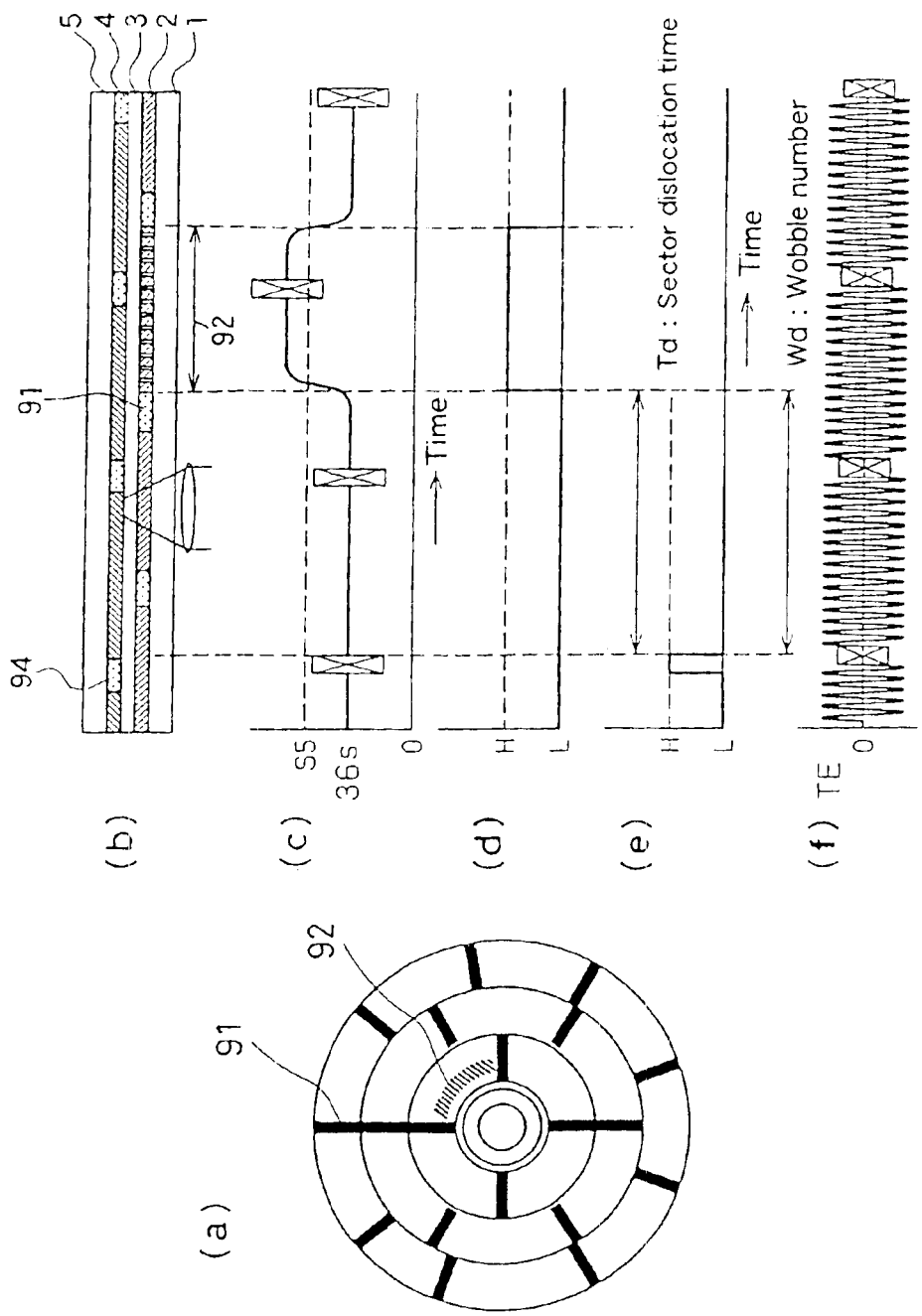
FIG. 9 is a configuration diagram showing another embodiment of a method for measuring the amount of sector dislocation in an optical information recording medium of the present invention.

Hereinafter, the method will be described specifically with reference to FIG. 9. A signal is recorded on a recordable management area or the continuous tracks in a data area of a first information layer. In this case, at least one sector or more remains unrecorded in the circumferential direction.

FIG. 9(a) shows the first information layer, where data are recorded on the continuous tracks of a first sector (i.e., the portion indicated by reference numeral 92) in the data potions of the first information layer. In this drawing, the detailed illustration of a second information layer is omitted. It is preferable that the number of continuous tracks of the first information layer of this embodiment is not less than the diameter of a light spot on the first information layer when light is focused on the second information layer.

FIG. 9(b) is a cross-sectional view of a recording medium, where a signal is reproduced from the second information layer 4 located at the same position as the continuous tracks on the first information layer 2 in the radial direction. In this drawing, the second information layer 4 is not recorded. Also, a first sector address portion 91 of the first information layer 2 and a first sector address portion 94 of the second information layer are spaced with at least one sector provided therebetween.

FIG. 9(c) shows a reproduced signal from the second information layer 4. The signal level of the reproduced signal 36s is increased in the portion corresponding to the recorded area of the first information layer 2. By comparing the reproduced signal 36s with a predetermined level S5, two-level signals are obtained, as shown in FIG. 9(d). Of the two-level signals, the range represented by "H" corresponds to the position of the first sector of the first information layer 2.

Of the two-level signals in FIG. 9(e), the range represented by "H" indicates the position of the first sector address portion 94 of the second information layer 4. The amount of sector dislocation between the second information layer 4 and the first information layer 2 can be determined by a time difference Td between the point at which a pulse falls, as shown in FIG. 9(e), and the point at which a pulse rises, as shown in FIG. 9(d).

Furthermore, when the tracks in the data area of the second information layer 4 are formed of wobbled guide grooves, the amount of dislocation can be obtained more precisely. FIG. 9(f) shows a tracking error signal (TE signal) from the guide grooves. A precise amount of dislocation can be determined in such a manner that the amount of wobble Wd, including the phase of a wobble signal between the first sector address portion 94 of the second information layer 4 and the beginning of the sector address portion 91 of the first information layer, is measured and multiplied by a length of wobble per cycle.

As described above, when the sector dislocation time (Td) is determined, errors may be caused because of the variation in a rotation system or the like. However, since the amount of wobble Wd is measured directly in length, such errors can be eliminated.

The sector dislocation information thus obtained is recorded on the management area or the burst cutting area, as described in Embodiment 1. Once the information is recorded on a recording medium, signals may be reproduced from these areas thereafter. Thus, the continuous tracks recorded here also can be used for data recording. Moreover, the sector dislocation information recorded can be applied to a reproducing method or recording method shown in Embodiment 1, and thereby the same effect can be provided.

Embodiment 3

Each of the above embodiments relates to a method for suppressing the fluctuation in amplitude caused by the recorded state in the track direction or the fluctuation in recording power. This embodiment relates to a method for achieving stable recording/reproduction by further reducing the fluctuation factors resulting from the recorded state in the track direction of the information layer on the light incident side.

Figure 4:
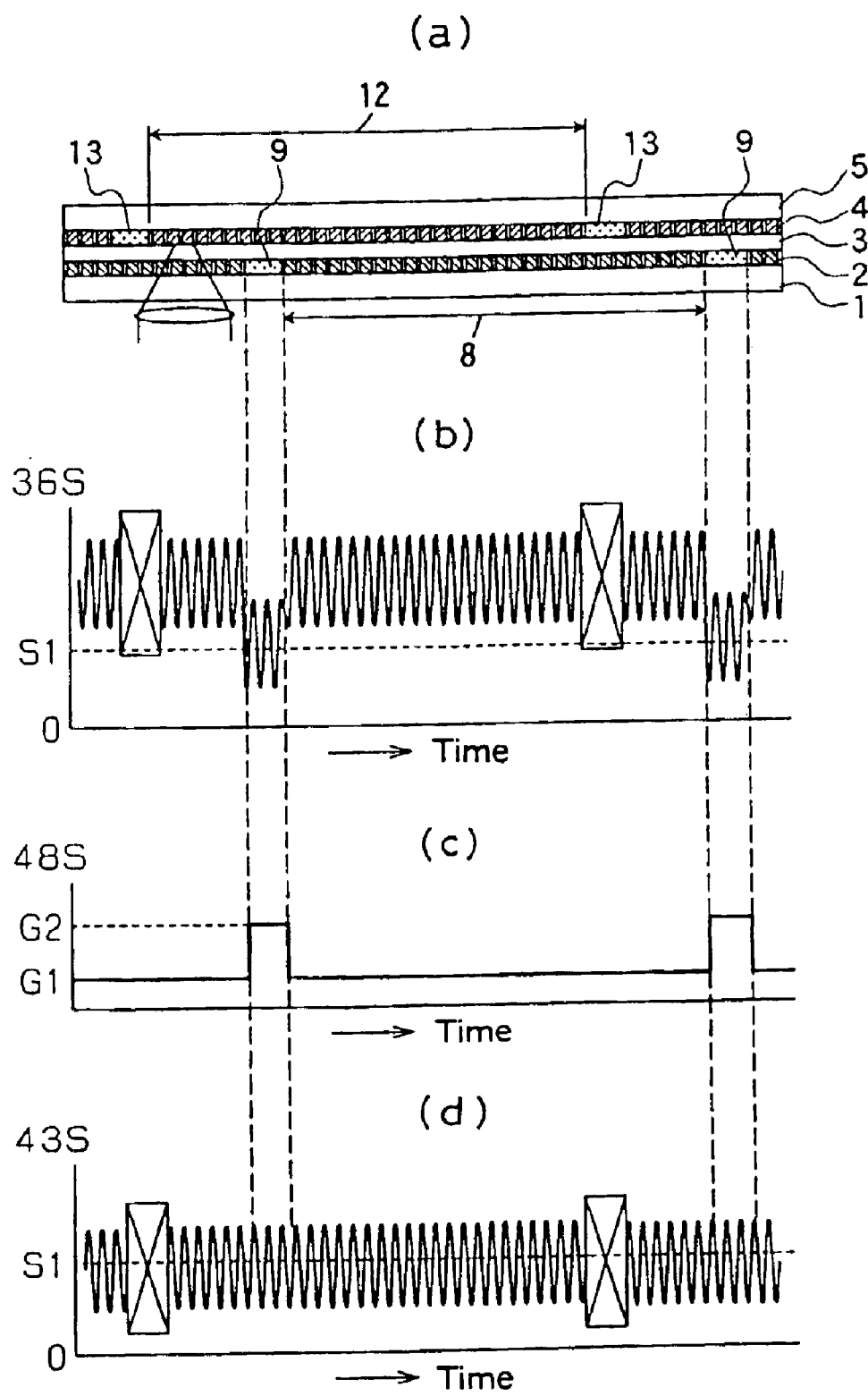
FIG. 4 shows an operation of the reproduction apparatus in FIG. 3.
Figure 6:
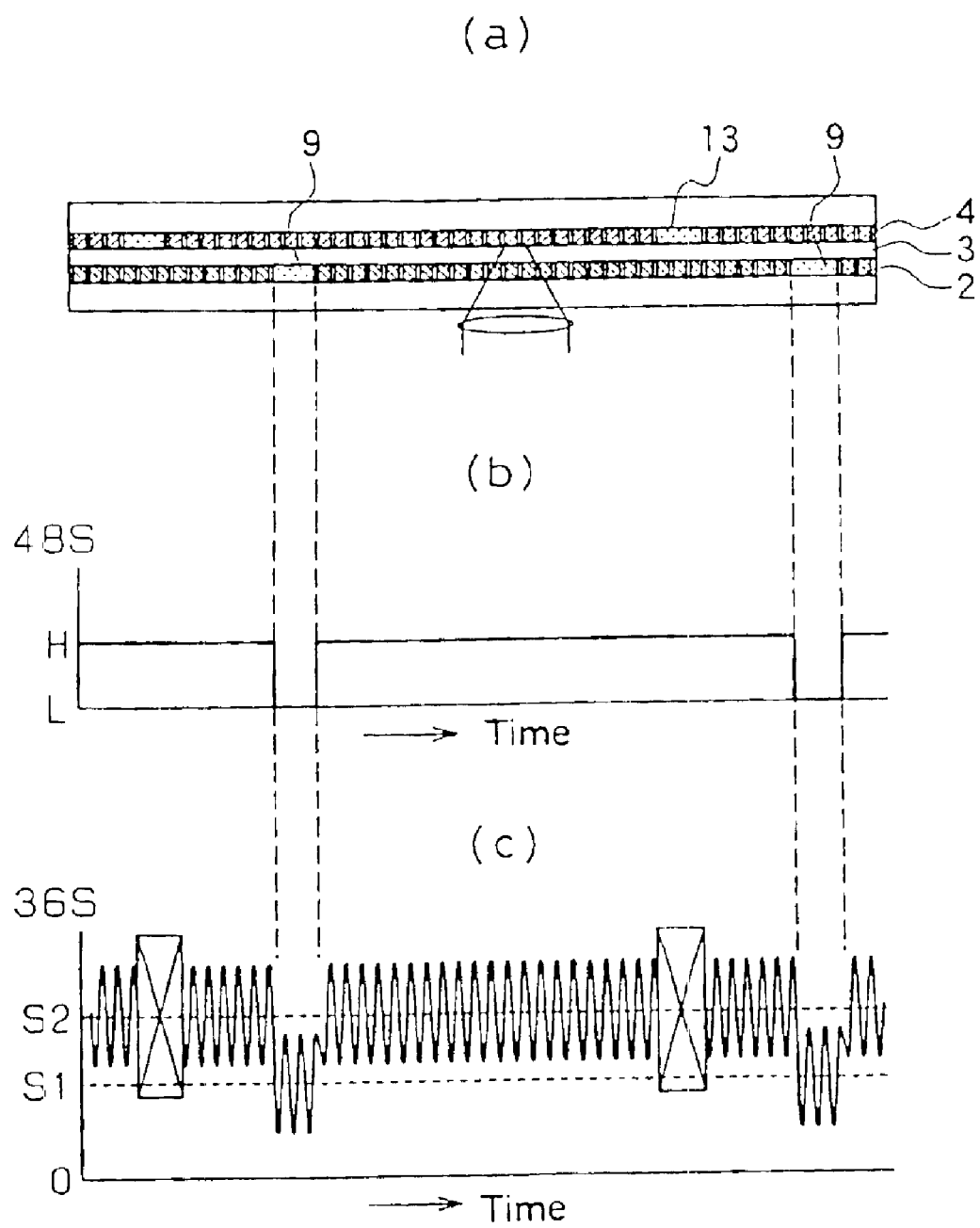
FIG. 6 shows a function of the optical information recording medium in FIG. 5.
Figure 8:
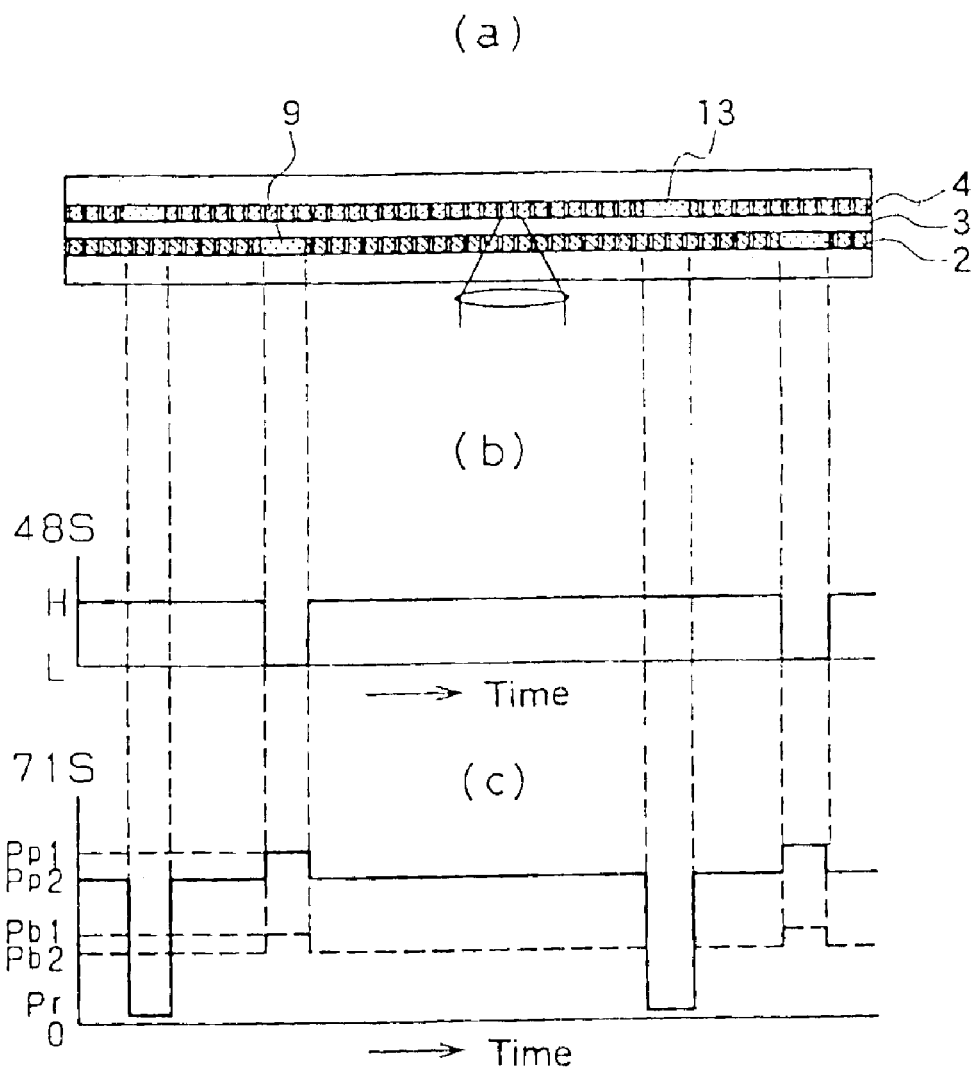
FIG. 8 shows an operation of the recording apparatus in FIG. 7.

FIGS. 4, 6, and 8 show a change in the level of the reproduced signal from the second information layer 4, depending on whether the first information layer 2 is recorded or not. In each case, a change in the amount of light passing through the sector address portions in the track direction is compensated.

However, when a light beam is focused on the second information layer 4, the area of the first information layer 2, through which the light beam is transmitted, depends mainly on the thickness of a separating layer and the NA of an objective lens. Here, an NA of the objective lens is taken as 0.5 to 0.6 and a thickness of the separating layer as 20 to 100 μm. In this case, the area of the first information layer 2 affecting a signal to be reproduced from the second information layer 4 becomes circular, having a diameter of about 20 to 100 μm.

Thus, the amount of light reaching the second information layer 4 varies depending on the recorded state of the first information layer 2 in this area, i.e., which causes errors in the optimum recording power of the second information layer 4 when viewed from the optical pickup side.

On the other hand, in the present invention, the second and the following information layers are recorded after the entire areas of the first information layer have been recorded during the manufacturing or recording of a recording medium.

First, the recording on the information layers when a thin film for recording is formed will be described. With a recording medium produced by the method of Embodiment 1, a signal is recorded on the entire data portion of the first information layer. This recording also serves to certify the recording medium: the area causing faulty recording due to the surface defects or the like is detected by the recording/reproduction on the user's area in the recording medium, and an alternate sector is allocated for the defective area.

In addition to the certifying operation, such entire-area recording of the present invention includes recording on the alternate area of the defective recording area. Moreover, when a test recording area or the like is provided in the inner or outer circumference of the information layer other than the user's area, those areas are recorded as well. For a two-layer optical disk, the entire area of the first information layer may be recorded. However, in the case of a recording medium having many more layers, a signal is recorded on the entire area of all the information layers except at least the most distant information layer from a light beam, so that the same effect can be provided.

When the above process is carried out during manufacturing a recording medium, a signal can be recorded on any location of any information layer at the time of insertion of the recording medium in an optical recording/reproducing apparatus.

Alternatively, it is possible that the recording on the entire area of the user's area is omitted during manufacturing and performed by a recording/reproducing apparatus instead. This can reduce the production cost of a recording medium.

There are two methods for recording by a recording/reproducing apparatus. The first one is such that the entire area of the first information layer is recorded when a recording medium is inserted in the recording/reproducing apparatus for the first time. Though the initial recording may cause a loss of time, this method can suppress a time loss in the subsequent operations.

The second method is such that the order of recording information on a recording medium is specified. That is, recording proceeds sequentially, starting with the first track of the first information layer, and when the entire area of the first information layer is completed, then the second information layer is recorded. At this time, it is necessary that a signal be recorded on the entire recording area, including an alternate sector, a test area, or the like, when the recording on the entire area of the user's area is completed. This recording may be performed upon insertion of a recording medium, completion of a predetermined recording, or completion of recording on the user's area of the first information layer.

When a signal is recorded on the most distant information layer, i.e., in the case of a two-layer recording medium, it is the second layer, the signal can be recorded on any location of the second information layer.

The above two methods may be selected according to the type of data to be recorded by a user. The first method is suitable for recording data information that requires a relatively small data capacity and a large number of files. The second method is suitable for recording continuous signals that require a large capacity for a file, such as video signals.

Moreover, to provide a stable operation for confirming the recording on the entire area of the information layers, management information for managing the entire-area recorded state of each information layer is stored on a recording medium. Specifically, information for identifying the recording on an entire area, which facilitates judging whether information signals are recorded on the entire area of each information layer, is recorded on a management area. For example, the management area of the information layer on the light source side may include an area containing the entire-recording identification information that identifies the recorded state of each information layer.

For recording information signals, first, the entire-area recording identification information of all the information layers on the light incident side with respect to the information layer to be recorded is reproduced. When the result of reproduction shows that the recording on the entire area of all the information layers on the light source side has been completed, a signal is recorded on any track of the target information layer.

On the other hand, when the entire-area recording identification information of the information layer on the light source side is not recorded, i.e., there are some information layers including unrecorded areas, either of the following is carried out: a signal is recorded sequentially from the blank track on the unrecorded information layer or a dummy signal is recorded on all the blank tracks on the unrecorded information layer. Thereafter, data are recorded on the target information layer.

In the above recording method, the information layers on the light incident side are always in the entire-area recorded state. Therefore, the difference in the amount of transmitted light between the sector address portion and the data portion of the information layer on the light incident side becomes a predetermined value. Thus, the operation for correcting the amplitude of the reproduced signal or recording power can be performed stably.

The entire-area recording identification information may be recorded on the management area of the information layer on the light incident side alone, or it may be recorded on the management area of each information layer.

Embodiment 4

Figure 10:
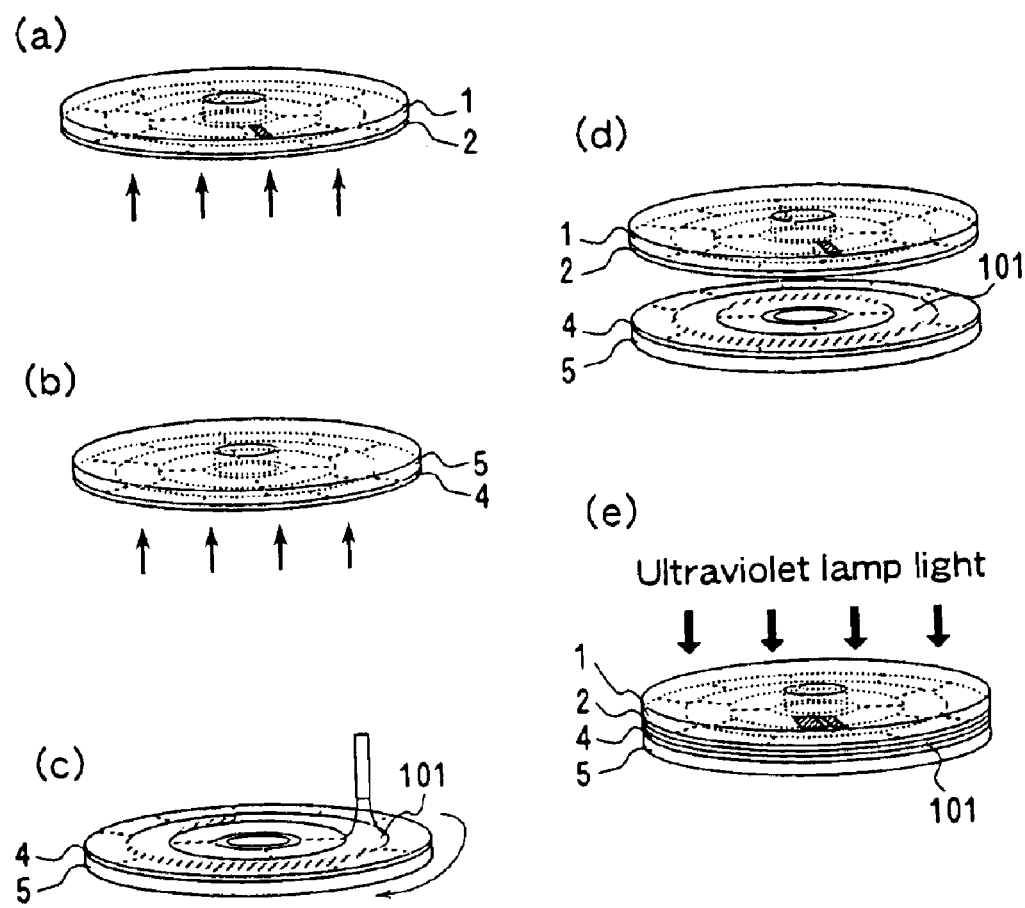
FIG. 10 is a flow diagram showing an embodiment of a method for manufacturing an optical information recording medium of the present invention.

Next, the details of an information recording medium of the present invention and a method for forming the same will be described. FIG. 10 shows an embodiment according to a method for manufacturing a two-layer recording medium. FIG. 10(a) shows a first film forming step, in which a first information layer 2 is formed on a first substrate 1 provided with guide grooves having a sector structure including sector address portions and data portions that are divided in the circumferential direction. Similarly, FIG. 10(b) shows a second film forming step, in which a second information layer 4 is formed on a second substrate 5 provided with guide grooves having a sector structure including sector address portions and data portions that are divided in the circumferential direction. The second substrate 5 acts as a protective plate.

FIG. 10(c) shows a coating step of coating the surface of the second information layer 4 with an adhesive 101. Here, an ultraviolet curable resin is used as the adhesive. FIG. 10(d) shows a bonding step of bonding the information layer 2 on the first substrate 1 and the information layer 4 on the second substrate 5 together via the adhesive 101. At this time, the substrates are rotated or pressed so that the thickness of the adhesive 101 between the substrates is uniform, if necessary.

FIG. 10(e) shows a hardening step of hardening the adhesive 101 by the irradiation of light of an ultraviolet lamp from the side of the first substrate 1. According to the above processes, a two-layer recording medium can be provided.

Next, the details of an information recording medium of the present information will be described with reference to FIG. 1. In the recording medium used for two-layer recording, information signals are reproduced by irradiating two information layers 2, 4 with light and detecting a change in the light reflected therefrom. Therefore, a light beam 7 for irradiation must be focused precisely on the information layer from which signals are reproduced. In particular, the first information layer 2 is required to have a certain transmissivity with respect to a wavelength of the light beam 7 so that light having a predetermined intensity reaches the second information layer 4. To stabilize the reproduction of signals from the two information layers, it is preferable that the first information layer 2 has a transmissivity of 30 to 80%.

Furthermore, information is recorded on the second information layer 4 in such a manner that the temperature of the portion irradiated with the light beam 7 at high intensity is raised to change the optical characteristics thereof. Thus, it is necessary that the second information layer 4 satisfies high absorptivity with respect to a wavelength of the light beam 7 as well as a large optical change, i.e., signals are reproduced at high efficiency in the recorded state.

It is preferable that a material used for the substrate 1 has a lower optical absorption with respect to a wavelength of the light beam for irradiation and allows concave-convex pits to be formed stably on its surface. Therefore, a resin material such as polycarbonate, polymethyl methacrylate (PMMA), glass material, or the like is used as a substrate material. The substrate 5 is not necessarily transparent to the light beam. However, it is preferable that the substrate 5 be formed of the same material as for the substrate 1 to prevent warping or the like and maintain its shape stably.

The information layer has the following concave-convex patterns: the guide grooves for data portions 8, 12 in a data area shown in FIG. 1; the address pits for sector address portions 9, 13; the concave-convex pits for the read-only portion in management areas 10, 14, and the guide grooves and the sector address portion for the recordable area in the management area.

Furthermore, the recordable management area includes an area containing information about the dislocation between information layers, where information for identifying the recording position is recorded, if necessary. Also, the guide grooves or concave-convex pits to form disk position identifiers 11, 15 are provided, if necessary.

For the two-layer recording medium, the above patterns are formed previously on the substrates in the form of concave-convex pits. To form these concave-convex patterns, mastering, which has been generally employed in compact disks (CD) or DVD, can be used. In the mastering process, first, a glass substrate with a photoresist-coating is exposed to an Ar laser and etched to remove the photoresist on the irradiated portion. Then, a film is formed on the substrate surface by Ni sputtering, which is further plated with Ni. Thereafter, the Ni is removed from the substrate. Finally, the surface of the Ni film is processed, resulting in a stamper. The stamper is set on a mold so that a resin material as described above is injection-molded, and thus a substrate having the predetermined concave-convex patterns on the surface can be provided.

Other methods for forming a substrate include a 2P (photo-polymerization) method, in which the patterns on a stamper are transferred using an ultraviolet curable resin. The 2P method will be described later in detail.

The information layers 2, 4 are formed of a recordable and reproducible thin film that changes in optical characteristics by absorbing the focused light and can be detected according to those changes by the light beam 7. Examples of a material for the thin film used as a recording layer that satisfies the above requirements include the following: a phase changeable material whose reflectance is changed with a change in the state of the thin film caused by irradiation of light; an organic material, such as dyes or the like, whose spectral reflectance is changed, and a photochromic material. Also, some thin films change their shape.

Examples of a phase changeable material may include a compound represented by GeSbTe that changes between the amorphous and the crystalline phase, i.e., a compound based on SbTe, InTe, GeTeSn, SbSe, TeSeSb, SnTeSe, InSe, TeGeSnO, TeGeSnAu, TeGeSnSb, InSbTe, AgInSbTe or the like, an oxide material based on Te.TeO$_2$, Te.TeO$_2$.Au, Te-TeO$_2$.Pd or the like, or a metallic compound that changes between the crystalline and the crystalline phase, i.e., a metallic compound based on AgZn, InSb or the like.

Examples of an organic dye material may include a leuco dye based on triphenylmethane or the like. Examples of a photochromic material may include a material based on spiropyran, fulgide, azo or the like.

The recordable information layer 4 can be classified into two types according to its functions: write-once type and rewritable type. The former can be recorded only once and the latter allows the recorded information to be rewritten. For the write-once type, only a single layer made of a phase changeable material or an organic dye material is formed on a substrate as an information layer. Alternatively, a two-layer structure, including a thin film layer for absorbing light and a metal layer, can be used to form an alloy by irradiation of light.

It is preferable that each information layer includes a plurality of layers (at least two layers), so that the materials that constitute the information layer change reversibly and the optical change in the recorded signals is increased. For example, the two-layer structure may be composed of the following: a dielectric layer and a recording layer, a recording layer and a reflective layer, or a reflective layer and a recording layer. In each structure, the layers are laminated in this order from the light incident side. Moreover, a three-layer structure may be composed of the following: a dielectric layer, a recording layer, and a dielectric layer or a dielectric layer, a recording layer, and a reflective layer. In each structure, the layers are laminated in this order from the light incident side. In a four-layer structure, e.g., a dielectric layer, a recording layer, a dielectric layer, and a reflective layer may be laminated in this order from the light incident side. There is a five-layer structure in which a first reflective layer, a dielectric layer, a recording layer, a dielectric layer, and a second reflective layer may be laminated.

As described above, the thin-film recording layer and the dielectric layer are formed in contact with each other, so that the degradation of the thin film during repetitive recording can be prevented and the optical change in the recorded information can be increased.

To maintain a certain amount of light on the second information layer 4, it is preferable that the separating layer 3 is formed of a material having a lower optical absorption with respect to the wavelength range of the incident light beam 7, in particular, the light through the first information layer 2. For example, the separating layer may be formed of a transparent adhesive or, like the substrate, a glass material, a resin material, or the like. When the substrates 1, 5 are formed of a resin material, it is preferable to use the same type of resin material for the separating layer so as to ensure mechanical reliability after bonding. The use of ultraviolet curable resin is further preferable because the time required for bonding can be shortened.

Figure 11:
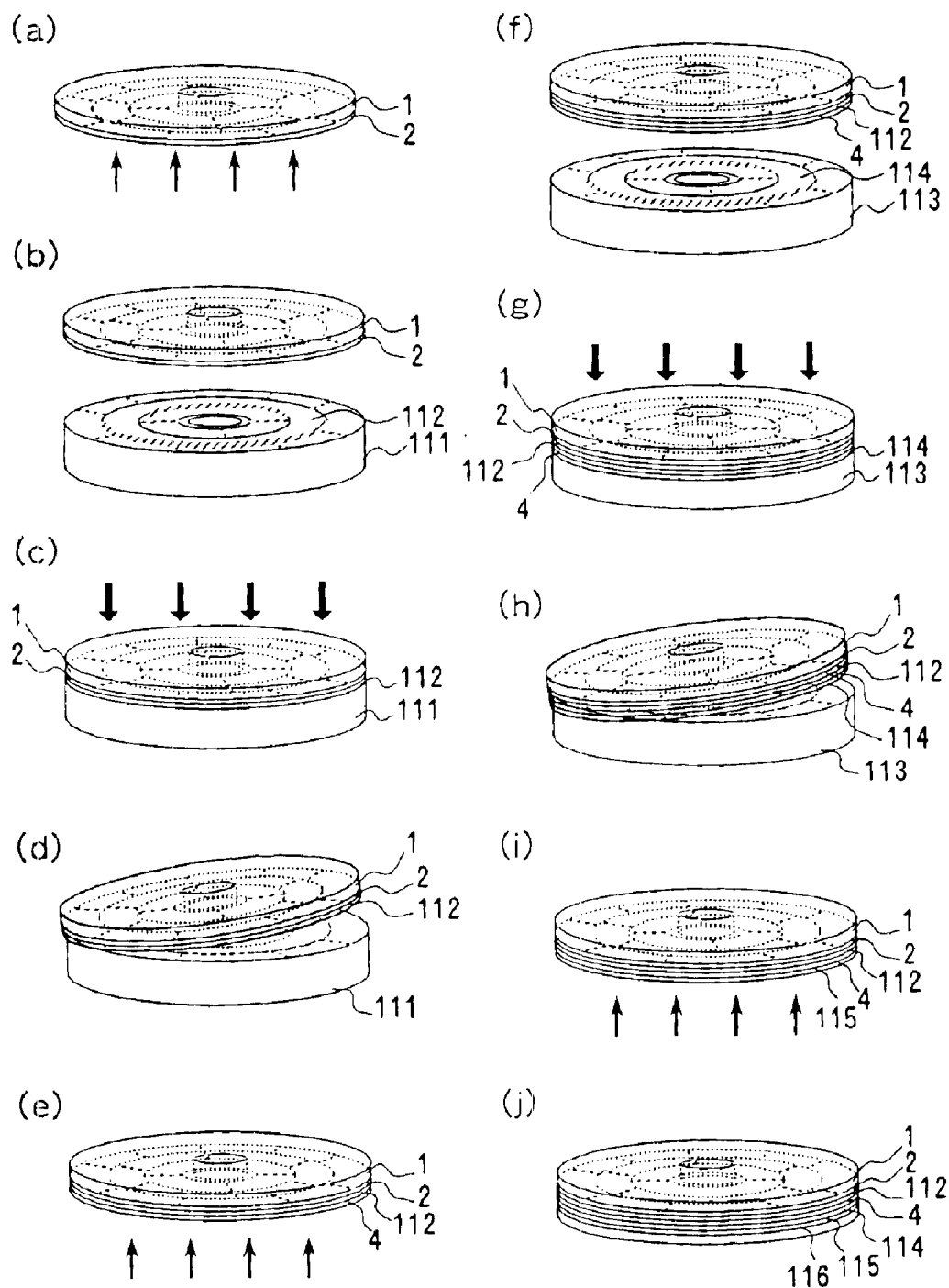
FIG. 11 is a flow diagram showing another embodiment of a method for manufacturing an optical information recording medium of the present invention.

The foregoing described the manufacturing method, in which two information layers are bonded together with a separating layer. Next, a second manufacturing method will be described with reference to FIG. 11. In the second manufacturing method, the guide grooves of a second information layer are formed by a 2P method using an ultraviolet curable resin.

FIG. 11(a) shows a film forming step of forming a first information layer 2 on an injection-molded substrate 1. The substrate has the following on the surface: the guide grooves for a data portion with a sector structure; the address pits for a sector address portion; the concave-convex pits for the read-only portion in a management area, and the guide grooves and the sector address portion for the recordable area in the management area. Also, the substrate has the guide grooves or concave-convex pits to form a disk position identifier, if necessary.

FIG. 11(b) shows a coating step of coating the surface of a stamper 111 having guide grooves with a transparent resin layer 112. Like the substrate 1, the stamper has the following on the surface: the guide grooves for a data portion with a sector structure; the address pits for a sector address portion; the concave-convex pit for the read-only portion in a management area, and the guide grooves and the sector address portion for the recordable area in the management area.

Furthermore, the recordable management area includes an area containing information about the dislocation between information layers, where information for identifying the recording position is recorded, if necessary. Also, the recordable area has the guide grooves or concave-convex pits to form a disk position identifier, if necessary.

FIG. 11(c) shows a bonding step of bonding the substrate 1 and the stamper 111 together via the resin layer 112 with the information layer 2 opposing the stamper 111. At this time, the resin layer 112 is diffused by pressure or rotation so as to be uniform between the substrate 1 and the stamper 111. After the bonding, the adhesive 112 is hardened by irradiation of ultraviolet light from the side of the substrate 1, as is indicated by the arrow in FIG. 11(c).

FIG. 11(d) shows a stripping step of stripping the substrate 1 from the stamper 111 at the boundary between the stamper 111 and the adhesive layer 112. FIG. 11(e) shows a second film forming step of forming a second information layer 4 on the separating layer formed of the adhesive 112. FIG. 11(f) shows a second coating step of coating the surface of a second stamper 113 having guide grooves with a transparent resin layer 114 that acts as a second separating layer. Then, the information layer 4 and the stamper 113 are opposed to each other.

FIG. 11(g) shows a second bonding step of bonding the substrate 1 and the stamper 113 together via the resin layer 114, while diffusing the resin layer by pressure or the like so as to be uniform between the substrate 1 and the stamper 113. Thereafter, the adhesive 114 is hardened by irradiation of ultraviolet light from the side of the substrate 1, as is indicated by the arrow in FIG. 11(g). FIG. 11(h) shows a stripping step of stripping the substrate 1 from the stamper 113 at the boundary between the stamper 113 and the adhesive layer 114.

FIG. 11(i) shows a third film forming step of forming a third information layer 115 on the separating layer formed of the adhesive 114. Finally, FIG. 11(j) shows a step of protective coating, where a protective layer (protective plate) 116 is formed on the third information layer, resulting in a three-layer recording medium.

The use of this method allows many more information layers to be laminated. For example, a four-layer recording medium can be provided by conducting the method in the following order: the steps shown in FIGS. 11(a) to 11(i), those shown in FIGS. 11(f) to 11(i), and finally the step shown in FIG. 11(j). When a plurality of information layers are laminated further, the steps shown in FIGS. 11(f) to 11(i) are repeated after those shown in FIG. 11(a) to 11(i) have been carried out, and thus any number of information layers can be laminated.

The above manufacturing method can provide a recording medium that includes a plurality of information layers, each having a sector structure, and that can detect the sector dislocation information for correcting the effect of the recorded state of the information layer on the light incident side.

Industrial Applicability

As described above, the present invention allows identification information about the amount of sector dislocation to be recorded on a recording medium. Also, the present invention can reduce demodulation errors during reproduction by switching amplification gain or slice level during reproduction according to the identification information about the amount of dislocation. Similarly, the present invention can provide stable data recording by switching recording power according to a gate signal.

Therefore, the present invention can be applied to a rewritable recording medium including a plurality of information layers, each having a sector structure, and also to a recording/reproducing apparatus for such a recording medium.

What is claimed is:

1. An optical information recording medium comprising a substrate and at least two information layers formed on the substrate, the information layer being formed of a thin film showing a change that can be detected optically by light bean irradiation,
   wherein a separating layer that is transparent to a wavelength of the light beam is formed between the information layers,
   each information layer comprises a sector area having sector address portions and data areas for recording information signals, the sector address portion and the data area being divided in a circumferential direction, and
   at least one of the information layers is provided with a management area for recording identification information about an amount of dislocation between the sector address portions of the respective information layers in the circumferential direction.

2. The optical information recording medium according to claim 1, wherein the management area is provided with a same form of guide groove as the data area and located close to the data area.

3. The optical information recording medium according to claim 1, wherein each information layer is provided with a sector position identifier for identifying positions of the sector address portions of the respective information layers, the sector position identifier having a certain relationship to the sector area in the circumferential direction.

4. An optical information recording medium comprising a substrate and at least two information layers formed on the substrate, the information layer being formed of a thin film showing a change that can be detected optically by light beam irradiation,
   wherein a separating layer that is transparent to a wavelength of the light beam is formed between the information layers,
   each information layer comprises a sector area having sector address portions and data areas for recording information signals, the sector address portion and the data area being divided in a circumferential direction, and
   identification information about an amount of dislocation between the sector address portions of the respective information layers in the circumferential direction is recorded on at least one of the information layers by utilizing a difference in state that can be detected optically in a predetermined pattern different from information signals of the data portion.

5. An optical information recording medium comprising a substrate and at least two information layers formed on the substrate, the information layer being formed of a thin film showing a change that can be detected optically by light beam irradiation,
   wherein a separating layer that is transparent to a wavelength of the light beam is formed between the information layers, and
   each information layer comprises:
   a sector area having sector address portions and data areas for recording information signals, the sector address portion and the data area being divided in a circumferential direction,
   a management area on which a type of information layer or recording conditions is written, and
   a sector position identifier for identifying a sector position and determining an amount of sector dislocation between the information layers, having a certain relationship to the sector area of the information layer in the circumferential direction.

6. A recording method for an optical information recording medium comprising:
   recording information signals on the optical information recording medium,
   the optical information recording medium comprising a substrate, at least two information layer formed on the substrate, and a separating layer formed between the information layers; the information layer being formed of a thin film showing a change that can be detected optically by light beam irradiation, the separating layer being transparent to a wavelength of the light beam, and each information layer comprising a sector area having sector address portions and data areas for recording information signals, the sector address portion and the data area being divided in a circumferential direction,
   wherein each information layer further comprises a sector position identifier having a certain relationship to the sector area in the circumferential direction, and
   dislocation between the sector position identifiers of the respective information layers is detected, so that identification information about an amount of dislocation between the sector address portions of the respective information layers in the circumferential direction is obtained and the identification information is recorded on at least one of the information layers.

7. The recording method according to claim 6, wherein the identification information is recorded as sub-information that is different from data information.

8. A recording method for an optical information recording medium comprising:
   recording information signals on the optical information recording medium,
   the optical information recording medium comprising a substrate, at least two information layers formed on the substrate, and a separating layer formed between the information layers; the information layer being formed of a thin film showing a change that can be detected optically by light beam irradiation, the separating layer being transparent to a wavelength of the light beam, and each information layer comprising a sector area having sector address portions and data areas for recording information signals, the sector address portion and the data area being divided in a circumferential direction, wherein among the information layers, a signal is recorded on continuous tracks in the sector area of the information layer on a light incident side with at least one sector being left unrecorded, a signal is reproduced from the information layer that is further from the information layer on the light incident side, and a time difference between a pulse-fall point of the sector address portion of the distant information layer, corresponding to the unrecorded portion of the information layer on the light incident side, and a pulse-rise point of the recorded portion of the information layer on the light incident side is calculated, so that identification information about an amount of dislocation between the sector address portions of the respective information layers in the circumferential direction is obtained and the identification information is recorded on at least one of the information layers.

9. The recording method according to claim 8, wherein the identification information is recorded as sub-information that is different from data information.

10. A recording method for an optical information recording medium comprising:

recording information signals on the optical information recording medium, the optical information recording medium comprising a substrate, at least two information layers formed on the substrate, and a separating layer formed between the information layers; the information layer being formed of a thin film showing a change that can be detected optically by light beam irradiation, the separating layer being transparent to a wavelength of the light beam, and each information layer comprising a sector area having sector address portions and data areas for recording information signals, the sector address portions and the data area being divided in a circumferential direction, wherein a guide groove in the data area is formed of a wobbled groove wobbling in a predetermined cycle, and an amount of wobble is measured, so that identification information about an amount of dislocation between the sector address portions of the respective information layers in the circumferential direction is obtained and the identification information is recorded on at least one of the information layers.

11. The recording method according to claim 10, wherein the identification information is recorded as sub-information that is different from data information.

12. A recording reproducing apparatus for an optical information recording medium, performing recording/reproduction of information signals on the optical information recording medium, the optical information recording medium comprising a substrate, at least two information layers formed on the substrate, and a separating layer formed between the information layers; the information layer being formed of a thin film showing a change that can be detected optically by light beam irradiation, the separating layer being transparent to a wavelength of the light beam, and each information layer comprising a sector area having sector address portions and data areas for recording information signals, the sector address portion and the data area being divided in a circumferential direction, the recording/reproducing apparatus comprising:

a sector dislocation identifying means for detecting an amount of dislocation between the sector areas of the respective information layers in the circumferential direction;

a gate generating means for controlling timing for correcting fluctuation in a reproduced signal, caused by an effect of a recorded state of each information layer, based on the detected dislocation amount, and a reproduced signal correcting means for correcting a reproduced signal in accordance with a gate signal from the gate generating means.

13. The recording/reproducing apparatus according to claim 12, wherein the reproduced signal correcting means switches amplification gain of a reproduced signal in accordance with the gate signal.

14. The recording/reproducing apparatus according to claim 12, wherein the reproduced signal correcting means switches a slice level of a reproduced signal in accordance with the gate signal.

15. The recording/reproducing apparatus according to claim 12, wherein at least one of the information layers is provided with a management area for recording identification information about the amount of dislocation, and the sector dislocation identifying means demodulates the identification information on the management area to detect the amount of dislocation.

16. The recording/reproducing apparatus according to claim 15, wherein the identification information is recorded on the management area as sub-information that is different from data information.

17. The recording/reproducing apparatus according to claim 12, wherein each information layer is provided with a sector position identifier for identifying positions of the sector address portions of the respective information layers, the sector position identifier having a certain relationship to the sector area in the circumferential direction, and the amount of dislocation is determined by dislocation between the sector position identifiers of the respective information layers.

18. The recording/reproducing apparatus according to claim 12, wherein the amount of dislocation is determined in the following manner:

among the information layers, a signal is recorded on continuous tracks in the sector area of the information layer on a light incident side with at least one sector being left unrecorded;

a signal is reproduced from the information layer that is further from the information layer on the light incident side, and a time difference between a pulse-fall point of the sector address portion of the distant information layer, corresponding to the unrecorded portion of the information layer on the light incident side, and a pulse-rise point of the recorded portion of the information layer on the light incident side is calculated.

19. The recording/reproducing apparatus according to claim 12, wherein a guide groove in the data area is formed of a wobbled groove wobbling in a predetermined cycle, and the amount of dislocation is determined by measuring an amount of wobble.

20. A recording/reproducing apparatus for an optical information recording medium, performing recording/reproduction of information signals on the optical information recording medium, the optical information recording medium comprising a substrate, at least two information layers formed on the substrate, and a separating layer formed between the information layers; the information layer being formed of a thin film showing a change that can be detected optically by light beam irradiation, the separating layer being transparent to a wavelength of the light beam, and each information layer comprising a sector area having sector address portions and data areas for recording information signals, the sector address portion and the data area being divided in a circumferential direction, the recording/reproducing apparatus comprising:

a sector dislocation identifying means for detecting an amount of dislocation between the sector areas of the respective information layers in the circumferential direction;

a gate generating means for controlling timing for correcting fluctuation in recording power, caused by an effect of a recorded state of each information layer, based on the detected dislocation amount, and a power switching means for switching recording power in accordance with a gate signal from the gate generating means.

21. The recording/reproducing apparatus according to claim 20, wherein at least one of the information layers is provided with a management area for recording identification information about the amount of dislocation, and the sector dislocation identifying means demodulates the identification information to detect the amount of dislocation.

22. The recording/reproducing apparatus according to claim 21, wherein the identification information is recorded on the management area as sub-information that is different from data information.

23. The recording/reproducing apparatus according to claim 20, wherein each information layer is provided with a sector position identifier for identifying positions of the sector address portions of the respective information layers, the sector position identifier having a certain relationship to the sector area in the circumferential direction, and the amount of dislocation is determined by dislocation between the sector position identifiers of the respective information layers.

24. The recording/reproducing apparatus according to claim 20, wherein the amount of dislocation is determined in the following manner:

among the information layers, a signal is recorded on continuous tracks in the sector area of the information layer on a light incident side with at least one sector being left unrecorded;

a signal is reproduced from the information layer that is further from the information layer on the light incident side, and a time difference between a pulse-fall point of the sector address portion of the distant information layer, corresponding to the unrecorded portion of the information layer on the light incident side, and a pulse-rise point of the recorded portion of the information layer on the light incident side is calculated.

25. The recording/reproducing apparatus according to claim 20, wherein a guide groove in the data area is formed of a wobbled groove wobbling in a predetermined cycle, and the amount of dislocation is determined by measuring an amount of wobble.

* * * * *

UNITED STATES PATENT AND TRADEMARK OFFICE
CERTIFICATE OF CORRECTION

PATENT NO. : 6,894,962 B1
DATED : May 17, 2005
INVENTOR(S) : Nishiuchi et al.

It is certified that error appears in the above-identified patent and that said Letters Patent is hereby corrected as shown below:

<u>Column 25,</u>
Line 57, "A recording reproducing apparatus" should read -- A recording/reproducing apparatus --.

Signed and Sealed this

Seventh Day of February, 2006

JON W. DUDAS
*Director of the United States Patent and Trademark Office*